(12) United States Patent
Kosaka et al.

(10) Patent No.: US 8,991,162 B2
(45) Date of Patent: Mar. 31, 2015

(54) ENGINE WITH EXHAUST GAS TREATMENT APPARATUS

(71) Applicant: Kubota Corporation, Osaka (JP)

(72) Inventors: Tetsuya Kosaka, Sakai (JP); Yusuke Suzuki, Sakai (JP); Yoshinobu Odawara, Sakai (JP); Nobuyuki Okabe, Sakai (JP)

(73) Assignee: Kubota Corporation, Osaka-shi, Osaka (JP)

( * ) Notice: Subject to any disclaimer, the term of this patent is extended or adjusted under 35 U.S.C. 154(b) by 0 days.

(21) Appl. No.: 13/949,354

(22) Filed: Jul. 24, 2013

(65) Prior Publication Data

US 2013/0305688 A1 Nov. 21, 2013

Related U.S. Application Data

(63) Continuation of application No. 12/986,290, filed on Jan. 7, 2011, now Pat. No. 8,516,807.

(30) Foreign Application Priority Data

Jan. 14, 2010 (JP) ................... 2010-005891
Oct. 26, 2010 (JP) ................... 2010-239612

(51) Int. Cl.
*F01N 13/18* (2010.01)
*F01N 3/08* (2006.01)

(52) U.S. Cl.
CPC .............. *F01N 3/08* (2013.01); *F01N 13/1822* (2013.01); *F01N 13/1855* (2013.01); *F01N 2590/08* (2013.01)
USPC .................. 60/299; 60/297; 60/311

(58) Field of Classification Search
CPC .............. F01N 3/0211; F01N 3/0215
USPC .............. 60/297, 299, 311; 285/62, 405, 412; 403/335, 336, 337, 338, 361
See application file for complete search history.

(56) References Cited

U.S. PATENT DOCUMENTS

| | | |
|---|---|---|
| 7,501,005 B2 | 3/2009 | Thaler |
| 2004/0031264 A1 | 2/2004 | Kojima |

(Continued)

FOREIGN PATENT DOCUMENTS

| | | |
|---|---|---|
| EP | 2202390 A1 | 6/2010 |
| EP | 2357333 A1 | 8/2011 |

(Continued)

OTHER PUBLICATIONS

Extended European Search Report issued Jul. 12, 2013 in EP Application No. 11250009.5.

(Continued)

*Primary Examiner* — Thomas Denion
*Assistant Examiner* — Jorge Leon, Jr.
(74) *Attorney, Agent, or Firm* — Pantich Schwarze Belisario & Nadel LLP

(57) ABSTRACT

An engine has an exhaust gas treatment apparatus attached thereto, wherein an exhaust pipe can be prevented from being damaged by a vibration of the engine body. An exhaust gas treatment apparatus is supported by an engine body and the engine body and the exhaust gas treatment apparatus communicate with each other through an exhaust pipe. The casing of the exhaust gas treatment apparatus consists of a plurality of casing units separable from each other. Connection flanges are disposed in respective end portions of the casing units. The casing units are coupled together by a connection of the connection flanges, and the exhaust gas treatment apparatus is supported by the engine body through the connection flanges.

18 Claims, 30 Drawing Sheets

(56) References Cited

U.S. PATENT DOCUMENTS

| | | | |
|---|---|---|---|
| 2007/0039316 A1* | 2/2007 | Bosanec et al. | 60/299 |
| 2007/0137188 A1 | 6/2007 | Ohya et al. | |
| 2009/0049830 A1 | 2/2009 | Suzuki | |
| 2009/0313979 A1 | 12/2009 | Kowada | |
| 2010/0101219 A1 | 4/2010 | Noller et al. | |
| 2010/0107613 A1 | 5/2010 | Masuda et al. | |
| 2010/0186394 A1* | 7/2010 | Harrison et al. | 60/299 |
| 2010/0205945 A1* | 8/2010 | Kowada | 60/297 |
| 2010/0269494 A1 | 10/2010 | Saito et al. | |
| 2010/0275588 A1* | 11/2010 | Kamata et al. | 60/322 |
| 2011/0000199 A1 | 1/2011 | Ezawa et al. | |
| 2012/0011833 A1 | 1/2012 | Kamei et al. | |

FOREIGN PATENT DOCUMENTS

| | | |
|---|---|---|
| JP | 2002-339739 A | 11/2002 |
| JP | 2003-120277 A | 4/2003 |
| JP | 2004-076632 A | 3/2004 |
| JP | 2004-340114 A | 12/2004 |
| JP | 2005-113795 A | 4/2005 |
| JP | 2005-155404 A | 6/2005 |
| JP | 2008-031955 A | 2/2008 |
| JP | 2008-281083 A | 11/2008 |
| JP | 2009-012609 A | 1/2009 |
| JP | 2009-062957 A | 3/2009 |
| JP | 2010-071175 A | 4/2010 |
| JP | 2010-071176 A | 4/2010 |
| JP | 2010-127094 A | 6/2010 |
| JP | 2010-229959 A | 10/2010 |
| WO | 2009054132 A1 | 4/2009 |
| WO | WO 2009142058 A1 * | 11/2009 |
| WO | 2012043137 A1 | 4/2012 |

OTHER PUBLICATIONS

Office Action issued Mar. 5, 2014 in CN Application No. 201110021171.9.

Office Action issued Jan. 7, 2014 in JP Application No. 2010-239612.

* cited by examiner

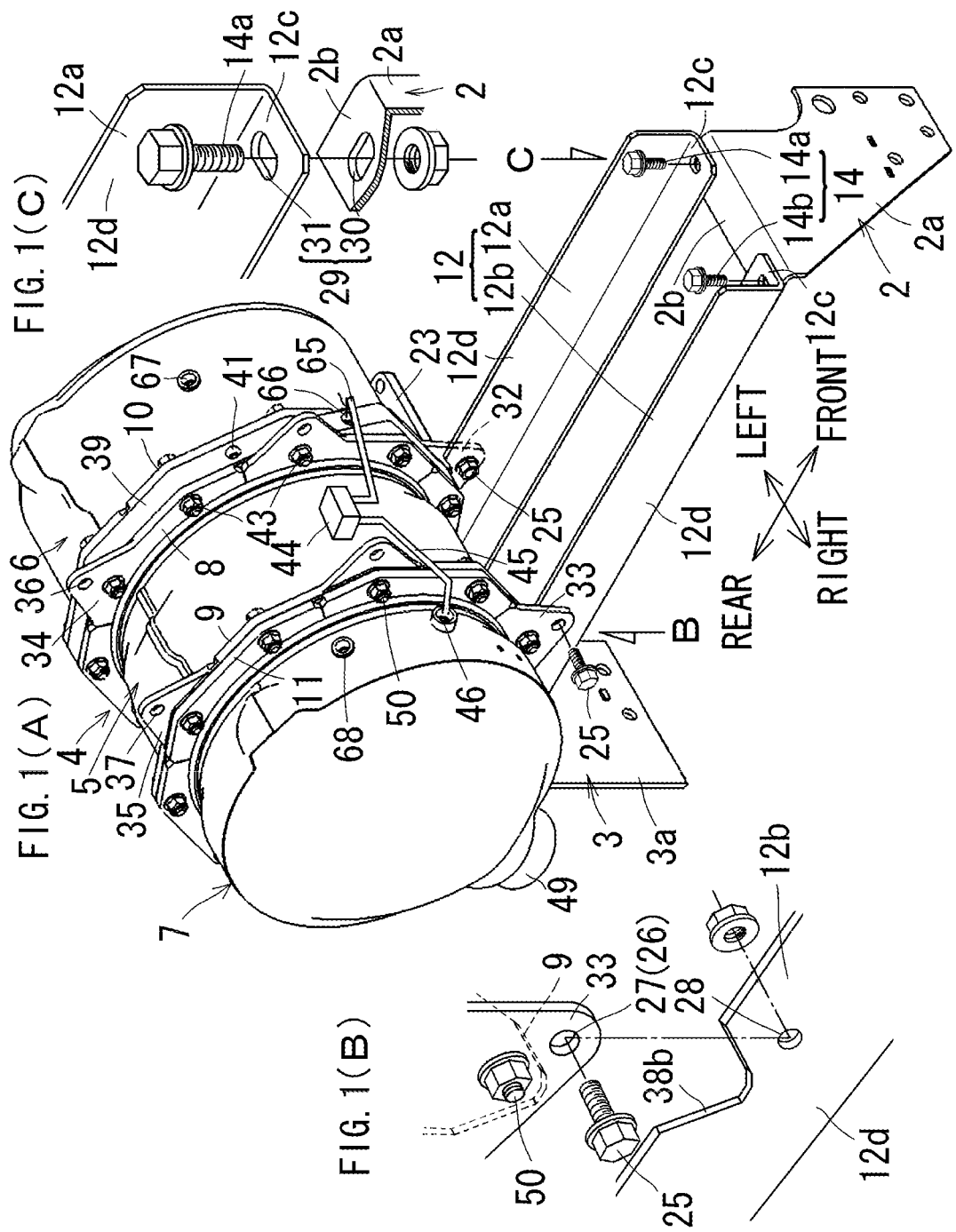

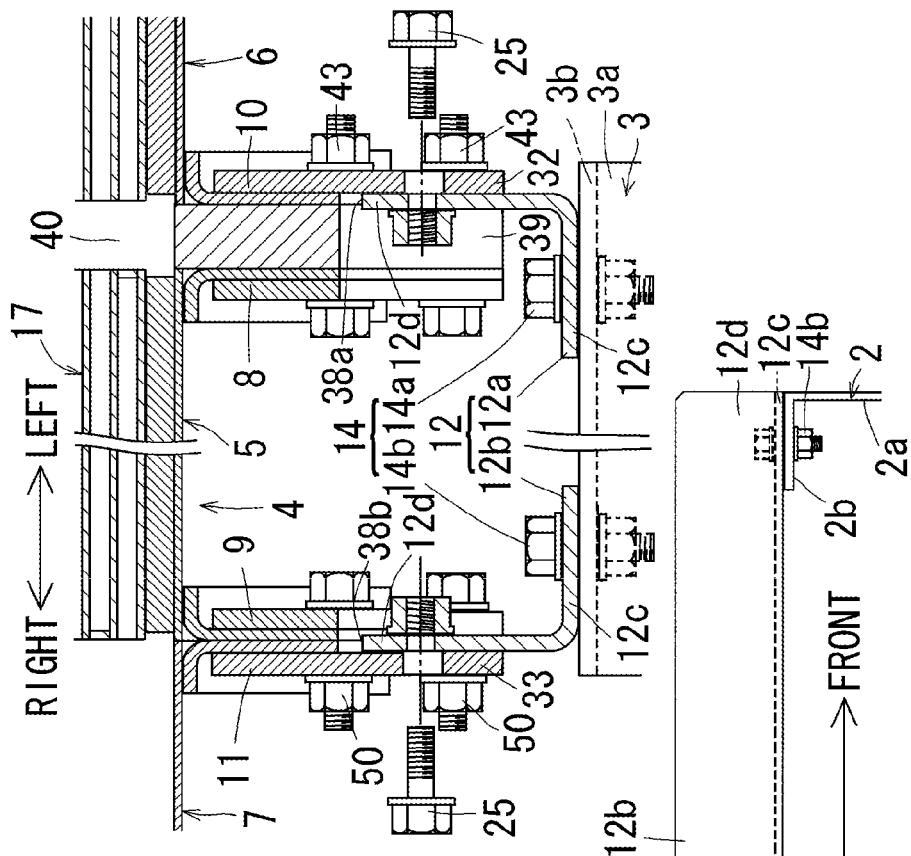
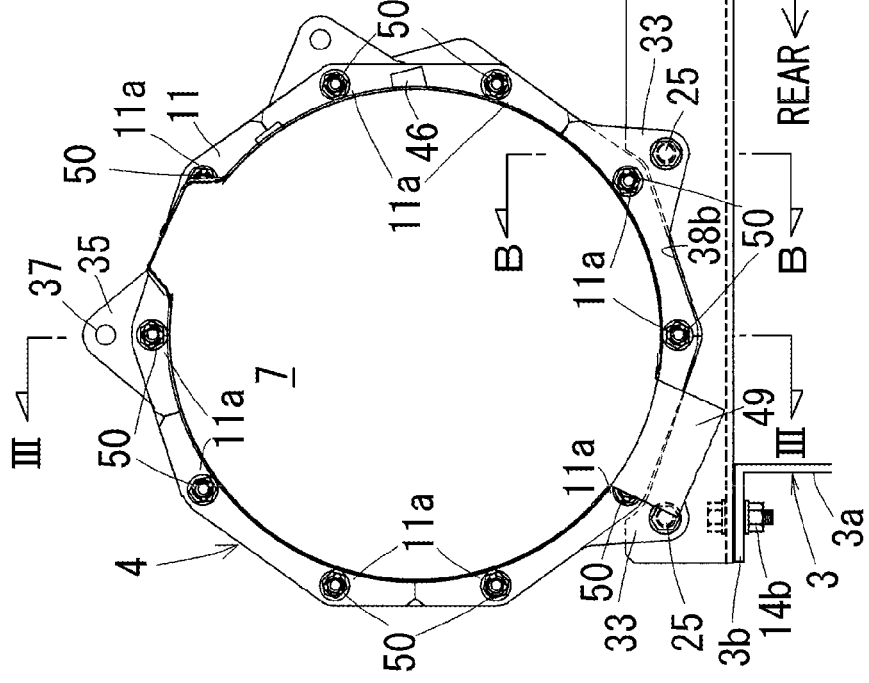
FIG.2(A)
FIG.2(B)

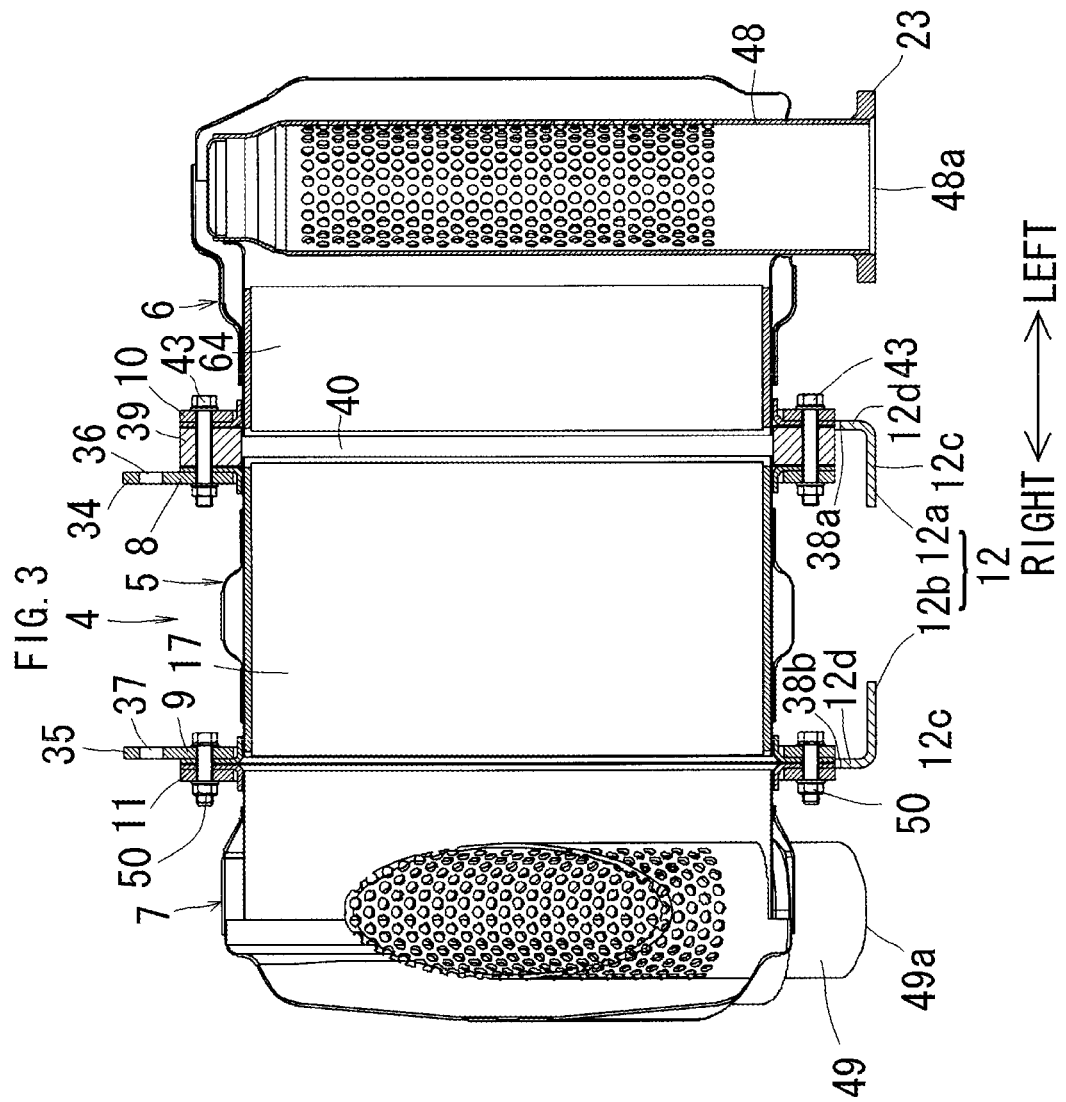

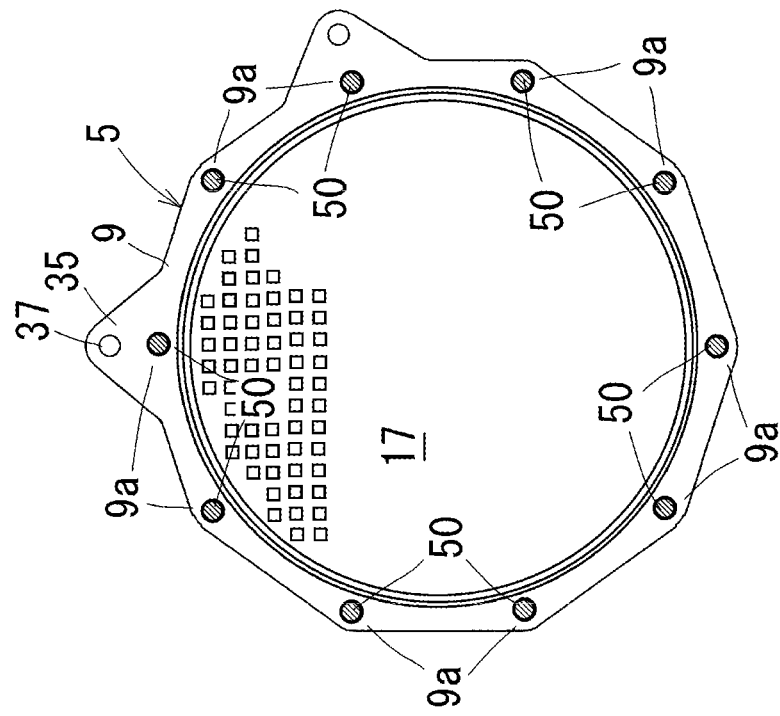
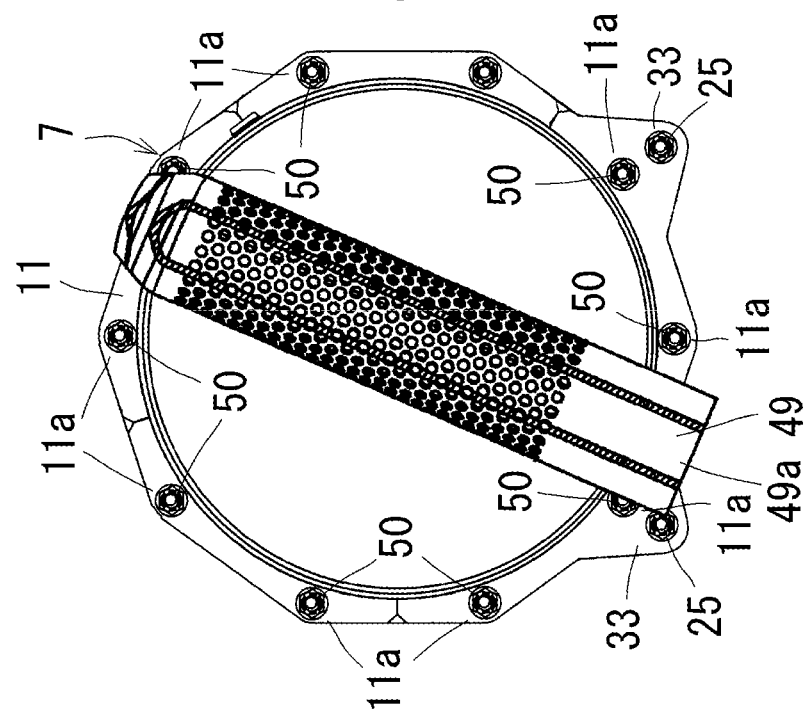

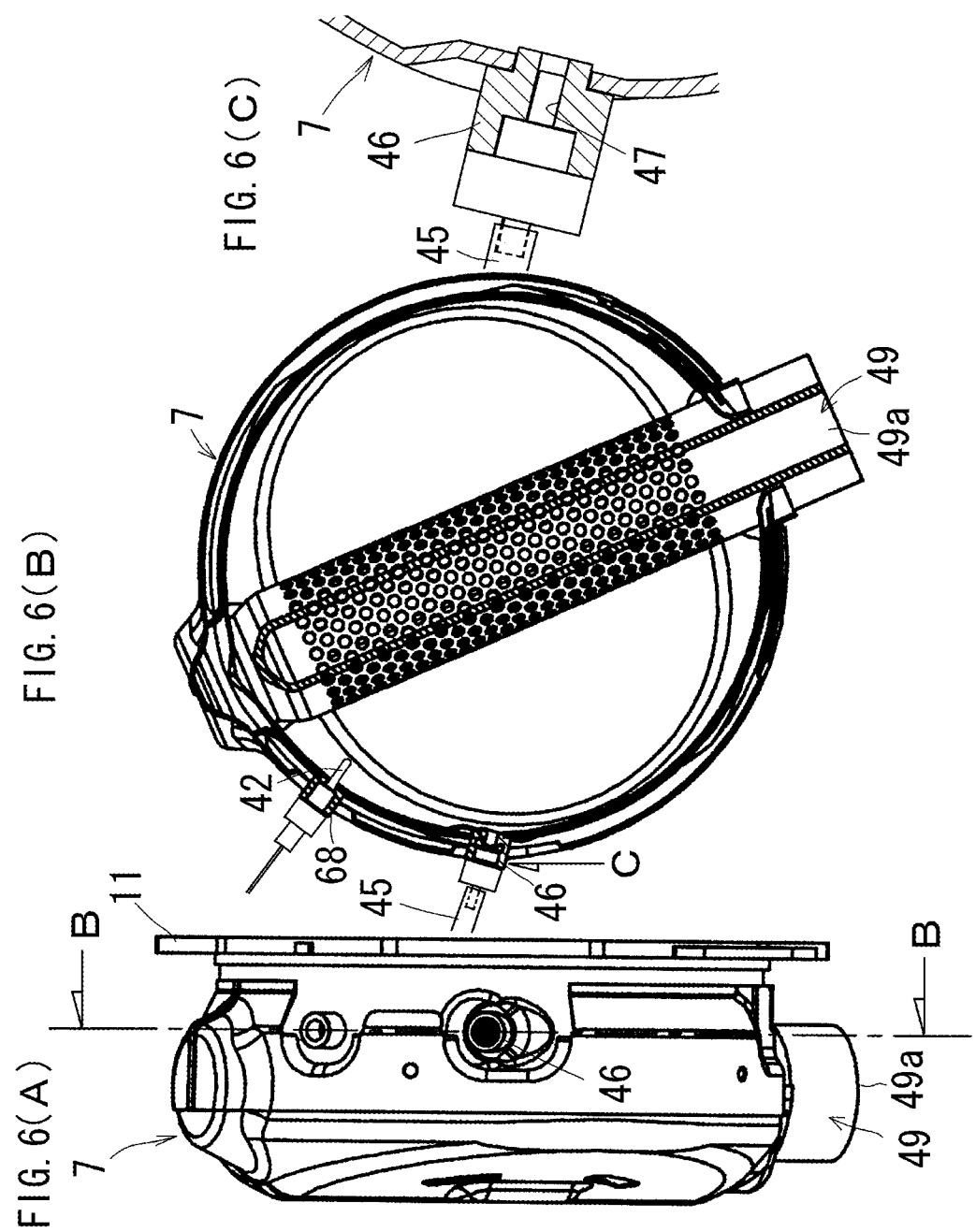

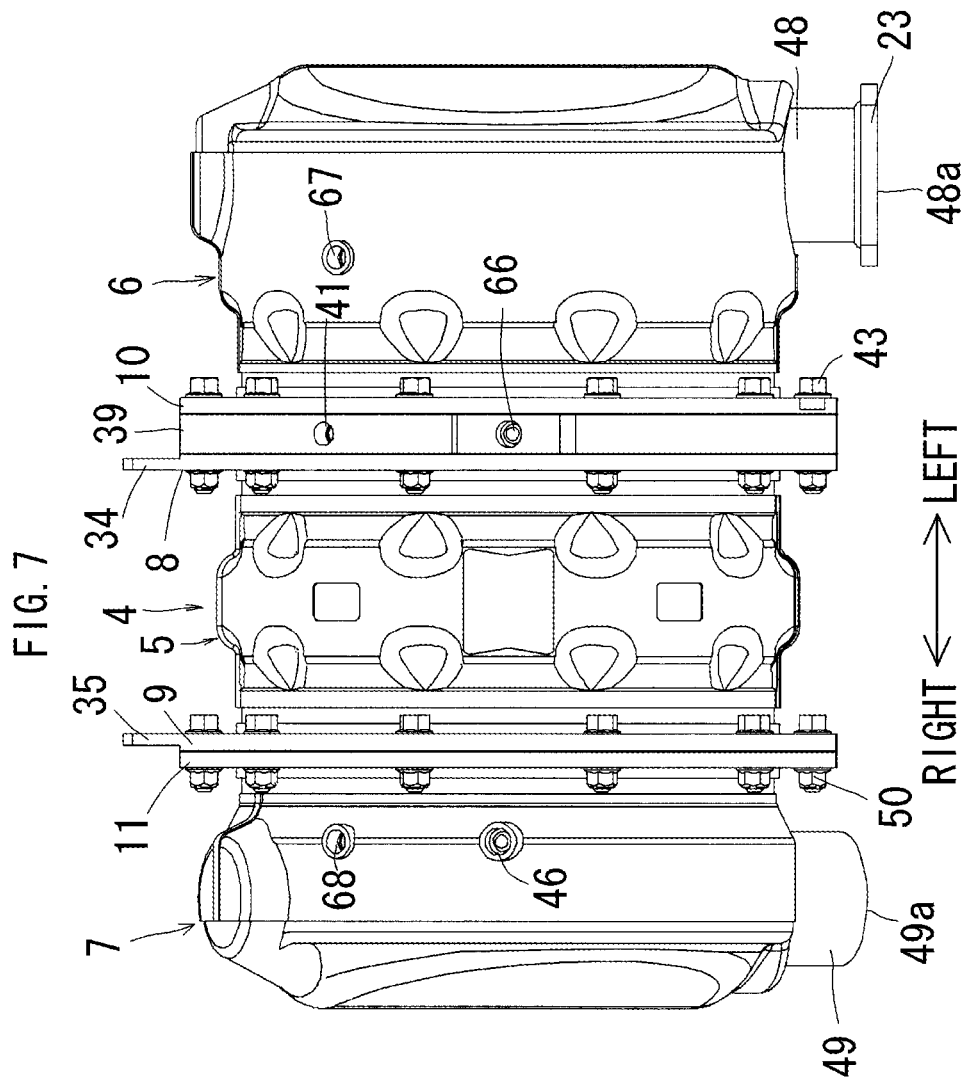

ENGINE WITH EXHAUST GAS TREATMENT APPARATUS

CROSS-REFERENCE TO RELATED APPLICATIONS

This application is a Continuation of U.S. patent application Ser. No. 12/986,290, filed Jan. 7, 2011, the disclosure of which is incorporated herein by reference.

BACKGROUND OF THE INVENTION

The present invention relates to an engine having an exhaust gas treatment apparatus attached thereto and, more particularly, to an engine having an exhaust gas treatment apparatus attached thereto, which is capable of preventing an exhaust pipe from being damaged by a vibration of the main body of the engine.

A conventional engine having an exhaust gas treatment apparatus attached thereto includes an engine in which an exhaust gas treatment apparatus is supported by the main body of the engine and the main body of the engine is configured to communicate with the exhaust gas treatment apparatus through an exhaust pipe (for example, refer to Patent Document 1).

According to this kind of engine having an exhaust gas treatment apparatus attached thereto, the exhaust gas treatment apparatus is integrated with the main body of the engine. There is an advantage in that the exhaust gas treatment apparatus is easily installed in a machine on which the engine is mounted.

However, the prior art is problematic in that the exhaust gas treatment apparatus is supported by the main body of the engine only in the exhaust pipe.

Japanese Patent Laid-open Publication No. 2009-12609 (refer to FIGS. 2 and 4)

The exhaust pipe is likely to be damaged by a vibration of the main body of the engine.

The exhaust gas treatment apparatus is supported by the main body of the engine only in the exhaust pipe. Thus, if the exhaust gas treatment apparatus is shaken by a vibration of the main body of the engine, a heavy load is applied to the exhaust pipe, and thus the exhaust pipe is likely to be damaged.

In particular, in case where a Diesel Particulate Filter (DPF) or a catalyst of heavy weight is accommodated in the exhaust gas treatment apparatus, the problem becomes serious.

BRIEF SUMMARY OF THE INVENTION

An object of the present invention is to provide an engine having an exhaust gas treatment apparatus attached thereto, which is capable of preventing an exhaust pipe from being damaged by a vibration of the main body of the engine.

As illustrated in FIG. 9, in an engine having an exhaust gas treatment apparatus attached thereto, an exhaust gas treatment apparatus 4 is supported by an engine body 1, and the engine body 1 and the exhaust gas treatment apparatus 4 are configured to communicate with each other through an exhaust pipe 13, as illustrated in FIG. 3, a casing of the exhaust gas treatment apparatus 4 consists of a plurality of casing units 5, 6, and 7 separable from each other, connection flanges 8, 9, 10, and 11 are disposed in respective end portions of the casing units 5, 6, and 7, and the casing units 5, 6, and 7 are coupled together by a connection of the connection flanges 8, 9, 10, and 11, and as illustrated in FIGS. 8, 14, 21, and 28, the exhaust gas treatment apparatus 4 is supported by the engine body 1 through the connection flanges 8, 9, 10, and 11.

As illustrated in FIGS. 8, 14, 21, and 28, the exhaust gas treatment apparatus 4 is supported by the engine body 1 through the connection flanges 8, 9, 10, and 11. Accordingly, the exhaust gas treatment apparatus 4 is robustly supported by the engine body 1 through the connection flanges 8, 9, 10, and 11 having higher rigidity. Although the exhaust gas treatment apparatus 4 is shaken by a vibration of the engine body 1, load applied to the exhaust pipe 13 can be reduced and the exhaust pipe 13 can be prevented from being damaged by a vibration of the engine body 1.

The connection flanges of the exhaust gas treatment apparatus can be prevented from being damaged by a vibration of the engine body.

As illustrated in FIGS. 8, 14, 21, and 28, the exhaust gas treatment apparatus 4 is supported by the engine body 1 through the plurality of connection flanges 8, 9, 10, and 11 which are spaced apart from each other. Although the exhaust gas treatment apparatus 4 is shaken by a vibration of the engine body 1, load applied to each of the connection flanges 8, 9, 10, and 11 is distributed. Accordingly, the connection flanges 8, 9, 10, and 11 of the exhaust gas treatment apparatus 4 can be prevented from being damaged by a vibration of the engine body.

A task of installing the support bracket in the support stays can be easily performed.

As illustrated in FIGS. 8, 14, and 21, the load of the exhaust gas treatment apparatus 4 is supported by the support stays 2 and 3 through the support bracket 12, and the support bracket 12 is installed in the support stays 2 and 3 using bracket installation fastening members 14. Accordingly, the support bracket 12 can be easily installed in the support stays 2 and 3 without the need to support the weight of the exhaust gas treatment apparatus 4 using an external support device, such as a crane, during a task of installing the support bracket 12 in the support stays 2 and 3.

The disposition of the exhaust gas treatment apparatus in the forward and backward directions can be freely set up.

As illustrated in FIGS. 8, 14, and 21, the support stays 2 and 3 consist of the support stays 2 and 3 on the front and back sides, the support stays 2 and 3 on the front and back sides are respectively installed on the front and back sides of the engine body 1, the support bracket 12 is lengthily formed forward and backward and installed between the support stays 2 and 3 on the front and back sides, and the exhaust gas treatment apparatus 4 is supported by the engine body 1 through the support stays 2 and 3 on the front and back sides in the state in which the exhaust gas treatment apparatus 4 has a long posture in the left and right directions. Thus, the disposition of the exhaust gas treatment apparatus 4 in the forward and backward directions can be freely set up.

The connection flanges can be prevented from being damaged by a shake of the exhaust gas treatment apparatus.

As illustrated in FIGS. 1(A) and 21, the front and back end portions of the support brackets 12a and 12b on the left and right sides are placed above the support stays 2 and 3 on the front and back sides and installed using bracket installation fastening members 14a and 14b on the left and right sides. Accordingly, a robust outside structure with high strength can be constructed using the support brackets 12a and 12b on the left and right sides and the support stays 2 and 3 on the front and back sides. Furthermore, a big shake of the exhaust gas treatment apparatus 4 due to a vibration of the engine body 1 can be suppressed, and thus the connection flanges 8, 9, 10, and 11 can be prevented from being damaged by a shake of the exhaust gas treatment apparatus 4.

The maintenance of a DPF can be easily performed.

As illustrated in FIG. 3, in accommodating a DPF 17 in the exhaust gas treatment apparatus 4, as illustrated in FIGS. 10, 15, 20, and 22, the exhaust gas treatment apparatus 4 is disposed on the upper side of a head cover 20 attached to the upper portion of a cylinder head 19. When the maintenance of the DPF 17 is performed, the exhaust gas treatment apparatus 4 or the DPF 17 can be taken out toward the upper side of the engine body 1 without intervening with the components of the engine body 1. Accordingly, the maintenance of the DPF 17 can be easily performed.

The regeneration efficiency of the DPF can be maintained high.

As illustrated in FIGS. 10, 15, 20, and 22, the exhaust gas treatment apparatus 4 is disposed at a position higher than the upper end portion 21 of the engine cooling fan 18 on the upper side of the head cover 20 attached to the cylinder head 19. Accordingly, the regeneration efficiency of the DPF 17 can be maintained high because the DPF 17 is difficult to be cooled by engine cooling wind.

A task of installing the exhaust inlet flange in the engine exhaust outlet flange can be easily performed.

As illustrated in FIGS. 9, 14, and 26, the exhaust inlet flange 23 of the exhaust gas treatment apparatus 4 is placed above the engine exhaust outlet flange 22 of the engine body 1. Accordingly, a task of installing the exhaust inlet flange 23 in the engine exhaust outlet flange 22 can be easily performed without the need to support the load on the side of the exhaust inlet flange 23 using an external support device, such as a crane, during the task of installing the exhaust inlet flange 23 in the engine exhaust outlet flange 22.

The attachment of the support brackets to the connection flanges can be performed without hindrance.

As illustrated in FIGS. 1(A) and 1(B), support brackets 12a and 12b are attached to the connection flanges 10 and 11 using bracket installation fastening members 25, position adjustment holes 26 of the bracket installation fastening members 25 are formed in at least one of the connection flanges 10 and 11 and the support brackets 12a and 12b, and the positions of at least upper and lower directions of the bracket installation fastening members 25 are adjusted using the position adjustment holes 26. Although the positions of the connection flanges 10 and 11 and the support brackets 12a and 12b are mutually deviated in the upper and lower directions, the attachment of the support brackets 12a and 12b to the connection flanges 10 and 11 can be performed without hindrance by up and down adjusting the positions of the bracket installation fastening members 25 using the position adjustment holes 26.

A task of attaching the support brackets to the connection flanges can be easily performed.

As illustrated in FIG. 1(B), in the state in which the width direction of the engine body 1 is the left and right directions, a large-diameter hole 27 and a small-diameter hole 28 are overlapped with each other left and right, and the bracket installation fastening member 25 is inserted into the overlapped position and configured to pass therethrough. Thus, if the connection flanges 10 and 11 and the support brackets 12a and 12b are aligned with each other, the bracket installation fastening members 25 are automatically aligned at a proper position. Accordingly, the attachment of the support brackets 12a and 12b to the connection flanges 10 and 11 can be easily performed without the need to adjust and manipulate the bracket installation fastening members 25.

The support brackets can be installed in the support stays without hindrance.

As illustrated in FIGS. 1(A) and 1(C), the support brackets 12a and 12b are installed in the support stays 2 and 3 using respective bracket installation fastening members 14a and 14b, the position adjustment holes 29 of the bracket installation fastening members 14a and 14b are installed in at least one of the support brackets 12a and 12b and the support stays 2 and 3, and the positions of at least the forward and backward directions and the left and right directions of the bracket installation fastening members 14a and 14b are adjusted using the position adjustment holes 29. Although the positions of the support stays 2 and 3 and the support brackets 12a and 12b are mutually deviated in the forward and backward directions or the left and right directions, the positions of the bracket installation fastening members 14a and 14b can be adjusted using the position adjustment holes 29, and the installation of the support brackets 12a and 12b in the support stays 2 and 3 can be performed without hindrance.

A task of installing the support brackets in the support stays can become easy.

As illustrated in FIG. 1(C), the long hole 30 of the forward and backward directions and the long hole 31 of the left and right directions are overlapped with each other up and down in a crossing form, and the bracket installation fastening members 14a and 14b are inserted into the overlapping position and configured to pass therethrough. When the support brackets 12a and 12b and the support stays 2 and 3 are aligned with each other, the bracket installation fastening members 14 are automatically aligned at a proper position. Accordingly, a task of installing the support brackets 12a and 12b in the support stays 2 and 3 is facilitated.

The maintenance of the DPF can be performed.

As illustrated in FIGS. 3, 14, 21, and 28, the exhaust inlet-side casing unit 6 and the exhaust outlet-side casing unit 7 are detachably coupled to both ends of the DPF accommodation casing unit 5. If both ends of the DPF 17 are exposed by separating the exhaust inlet-side casing unit 6 and the exhaust outlet-side casing unit 7 from the DPF accommodation casing unit 5, the maintenance of the DPF 17, such as washing of ashes accumulated in the DPF 17, can be performed.

The maintenance of the DPF can be easily performed.

As illustrated in FIGS. 1(A) and 28, in the state in which the exhaust inlet-side casing unit 6 and the exhaust outlet-side casing unit 7 are supported by the engine body 1, the DPF accommodation casing unit 5 can be pulled out between the exhaust inlet-side casing unit 6 and the exhaust outlet-side casing unit 7. Accordingly, the maintenance of the DPF 17, such as washing of ashes accumulated in the DPF 17, can be easily performed.

The maintenance of the DPF can be easily performed.

As illustrated in FIGS. 1(A) and 28, the pull-up locking units 36 and 37 of the DPF accommodation casing unit 5 are installed in the pull-up protrusions 34 and 35. Accordingly, the maintenance of the DPF can be easily performed because the DPF accommodation casing unit 5 can be simply pulled up using an external support device, such as a crane.

The exhaust gas treatment apparatus and the support bracket can be easily aligned with each other.

As illustrated in FIGS. 2 (A) and (B), a flange-fit concave unit 38b having an upper portion opened is installed in the support bracket 12b, and the lower edge portion of at least one of the connection flanges 9 and 11 where the DPF accommodation casing unit 5 and the exhaust outlet-side casing unit 7 overlap with each other is fitted into the flange-fit concave unit 38b. Accordingly, the exhaust gas treatment apparatus 4 and the support bracket 12 can be easily aligned with each other.

The exhaust gas treatment apparatus can be compacted.

As illustrated in FIG. 3, a ring-shaped spacer 39 is inserted between the connection flanges 8 and 10 of the DPF accommodation casing unit 5 and the exhaust inlet-side casing unit 6, and a DPF inlet-side space 40 is formed within the ring-shaped spacer 39. As illustrated in FIGS. 4(B) and 28, a sensor installation hole 41 is formed in the ring-shaped spacer 39, and an exhaust sensor 42 is inserted from the sensor installation hole 41 toward the DPF inlet-side space 40. Accordingly, the exhaust gas treatment apparatus 4 can be compacted because the DPF inlet-side space 40 can be narrowed.

However, in case where a sensor installation boss is installed on the peripheral wall of a DPF accommodation casing unit using welding, all the peripheral edge portions of the sensor installation boss need to be welded, and space through which a welding torch can enter needs to be secured between the sensor installation boss and the connection flange of a DPF welding casing unit. Accordingly, the distance between the connection flange and a sensor is widened, and an exhaust inlet-side space has to be widened, resulting in an increase of the exhaust gas treatment apparatus in size.

The disposition and posture of an exhaust sensor can be freely selected.

As illustrated in FIGS. 1(A) and 28, the posture of the ring-shaped spacer 39 can be changed in the circumferential direction and thus the position and posture of the sensor installation hole 41 can be changed. Accordingly, the disposition and posture of the exhaust sensor 42 can be freely selected.

The erroneous detection of the exhaust pressure sensor can be prevented.

As illustrated in FIGS. 6(C), 14, 21, and 28, a pipe installation boss 46 having the exhaust pressure entrance pipe 45 of an exhaust pressure sensor 44 installed therein is installed in the peripheral wall of the exhaust outlet-side casing unit 7, and the boss hole 47 of the pipe installation boss 46 is upwardly formed externally. Thus, condensation water remaining in the exhaust outlet-side casing unit 7 can be prevented from entering the exhaust pressure entrance pipe 45 of the exhaust pressure sensor 44, and thus the erroneous detection of the exhaust pressure sensor 44 can be prevented.

The disposition of an exhaust path on the upper stream side of an exhaust inlet pipe can be freely selected.

As illustrated in FIGS. 4(C), 14, 21, and 28, the posture of the exhaust inlet-side casing unit 6 can be changed in the circumferential direction and thus the direction of an inlet 48a of the exhaust inlet pipe 48 can be changed. Accordingly, the disposition of an exhaust path on the upper stream side of the exhaust inlet pipe 48 can be freely selected.

The disposition of an exhaust path on the lower stream side of an exhaust outlet pipe can be freely selected.

As illustrated in FIGS. 5(A), 5(B), 14, 25, and 28, the posture of the exhaust outlet-side casing unit 7 can be changed in the circumferential direction and thus the direction of an outlet 49a of the exhaust outlet pipe 49 can be changed. Accordingly, the disposition of an exhaust path on the lower stream side of the exhaust outlet pipe 49 can be freely selected.

The maintenance of the DPF can be easily performed.

As illustrated in FIGS. 28 and 29, the exhaust gas treatment apparatus 4 has a long posture in the left and right directions, and the DPF accommodation casing unit 5 is disposed on the upper back side of a flywheel housing 51 immediately after the head cover 20 attached to the upper portion of the cylinder head 19. When the maintenance of the DPF 17 is performed, the exhaust gas treatment apparatus 4 or the DPF accommodation casing unit 5 can be taken out toward the upper side of the engine body 1 without intervening with the components of the engine body 1. Accordingly, the maintenance of the DPF 17 can be easily performed.

The total height of the engine can be suppressed low.

As illustrated in FIGS. 28 and 29, in the state in which the exhaust gas treatment apparatus 4 has a long posture in the left and right directions, the DPF accommodation casing unit 5 of the exhaust gas treatment apparatus 4 is disposed on the upper back side of the flywheel housing 51 immediately after the head cover 20 attached to the upper portion of the cylinder head 19. Accordingly, the total height of the engine can be suppressed low.

The regeneration efficiency of the DPF can be maintained high.

As illustrated in FIG. 8, the engine cooling fan 21 is disposed in the front part of the engine body 1. As illustrated in FIGS. 28 and 29, in the state in which the exhaust gas treatment apparatus 4 has a long posture in the left and right directions, the DPF accommodation casing unit 5 of the exhaust gas treatment apparatus 4 is disposed on the upper back side of the flywheel housing 51 immediately after the head cover 20 attached to the upper portion of the cylinder head 19. Accordingly, the regeneration efficiency of the DPF can be maintained high because the DPF 17 is difficult to be cooled by engine cooling wind.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings:

FIGS. 1(A) to 1(C) are diagrams illustrating an engine having an exhaust gas treatment apparatus attached thereto according to a first embodiment of the present invention. FIG. 1(A) is a perspective view of the exhaust gas treatment apparatus and peripherals thereof seen from the upper side on the front right side. FIG. 1(B) is an exploded view of a portion indicated by an arrow B in FIG. 1(A). FIG. 1(C) is an exploded view of a portion indicated by an arrow C in FIG. 1(A).

FIG. 2(A) is a lateral view of the exhaust gas treatment apparatus of FIG. 1(A) and peripherals thereof, seen from the right side, and FIG. 2(B) is a cross-sectional view of FIG. 2(A) taken along line B-B.

FIG. 3 is a cross-sectional view of FIG. 2(A) taken along line

FIG. 4(A) is a longitudinal side view of a DPF accommodation casing unit seen from the right side, FIG. 4(B) is a lateral view of a ring-shaped spacer seen from the right side, and FIG. 4(C) is a lateral view of an exhaust inlet-side casing unit seen from the right side.

FIGS. 5(A) and 5(B) are diagrams illustrating the exhaust gas treatment apparatus of FIG. 1(A). FIG. 5(A) is a lateral side view of an exhaust outlet-side casing unit seen from the right side, and FIG. 5(B) is a lateral view of the DPF accommodation casing unit seen from the right side.

FIGS. 6(A) to 6(C) are diagrams illustrating the exhaust gas treatment apparatus of FIG. 1(A). FIG. 6(A) is a front view of the exhaust outlet-side casing unit, FIG. 6(B) is a cross-sectional view of FIG. 6(A) taken along line B-B, and FIG. 6(C) is an enlarged view of a portion indicated by an arrow C of FIG. 6(B).

FIG. 7 is a front view of the exhaust gas treatment apparatus of FIG. 1(A).

DETAILED DESCRIPTION OF THE INVENTION

Figure 28:
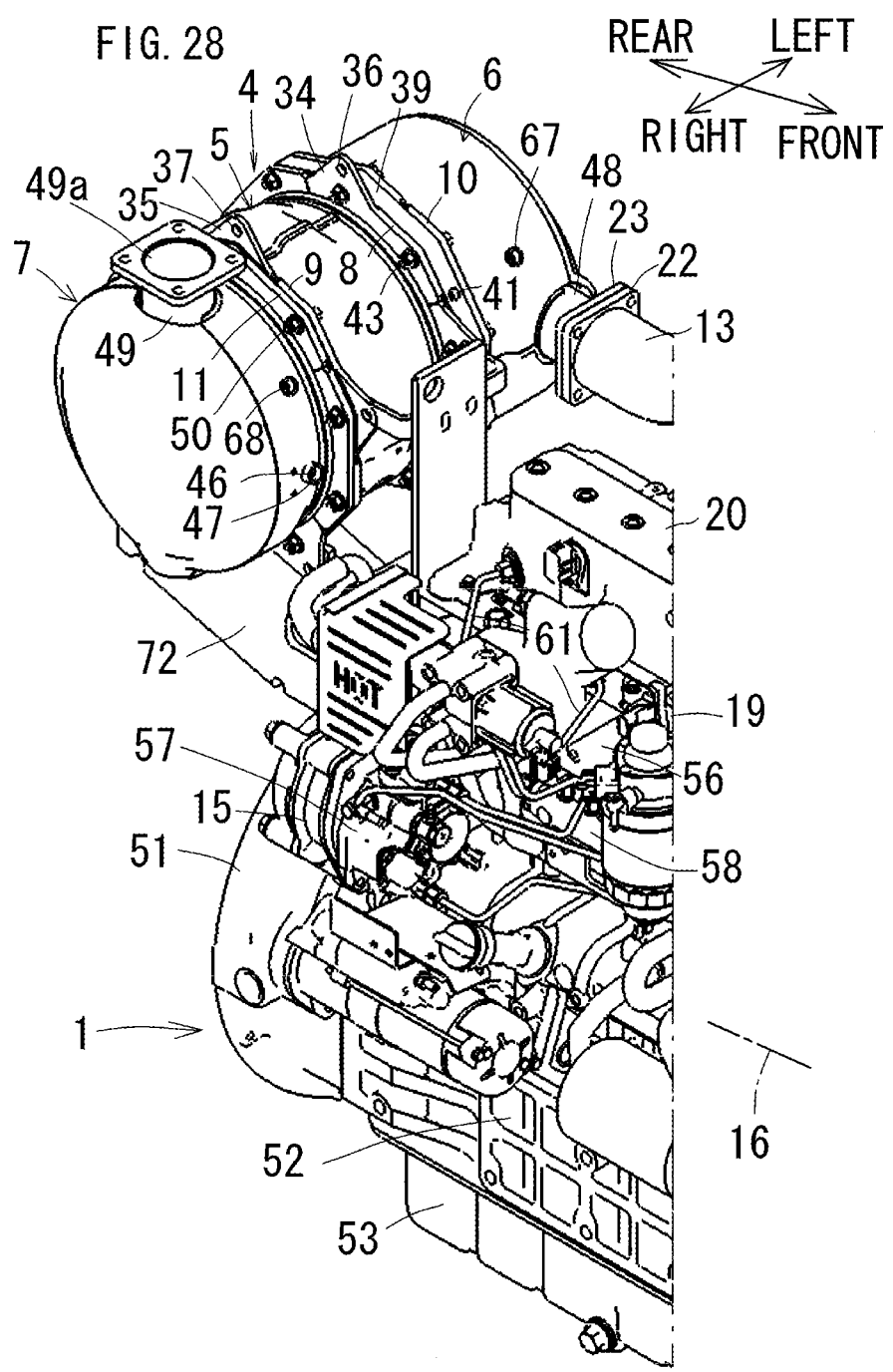
FIG. 28 is a perspective view of the back part of an engine having an exhaust gas treatment apparatus attached thereto according to a fourth embodiment of the present invention, which is seen from the upper side on the front right side.
Figure 29:
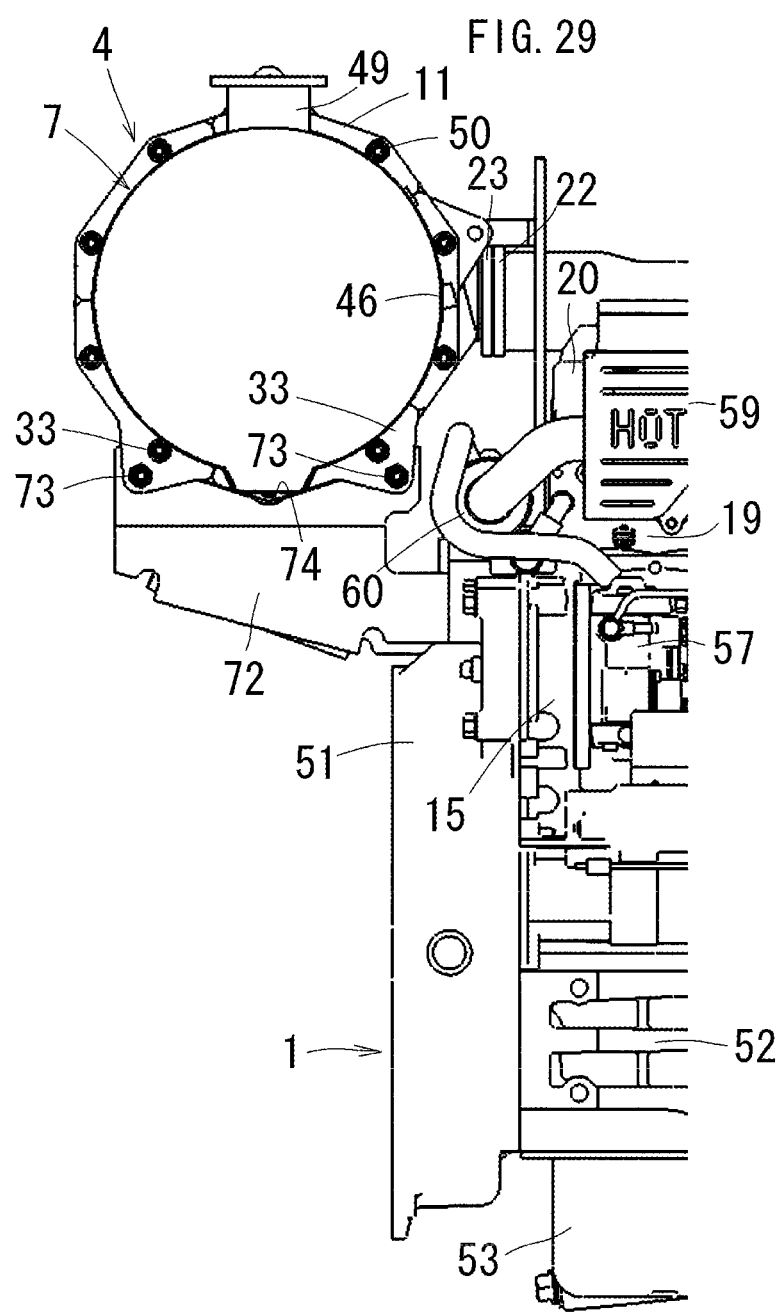
FIG. 29 is a lateral view of the back part of the engine of FIG. 28, seen from the right side.
Figure 30:
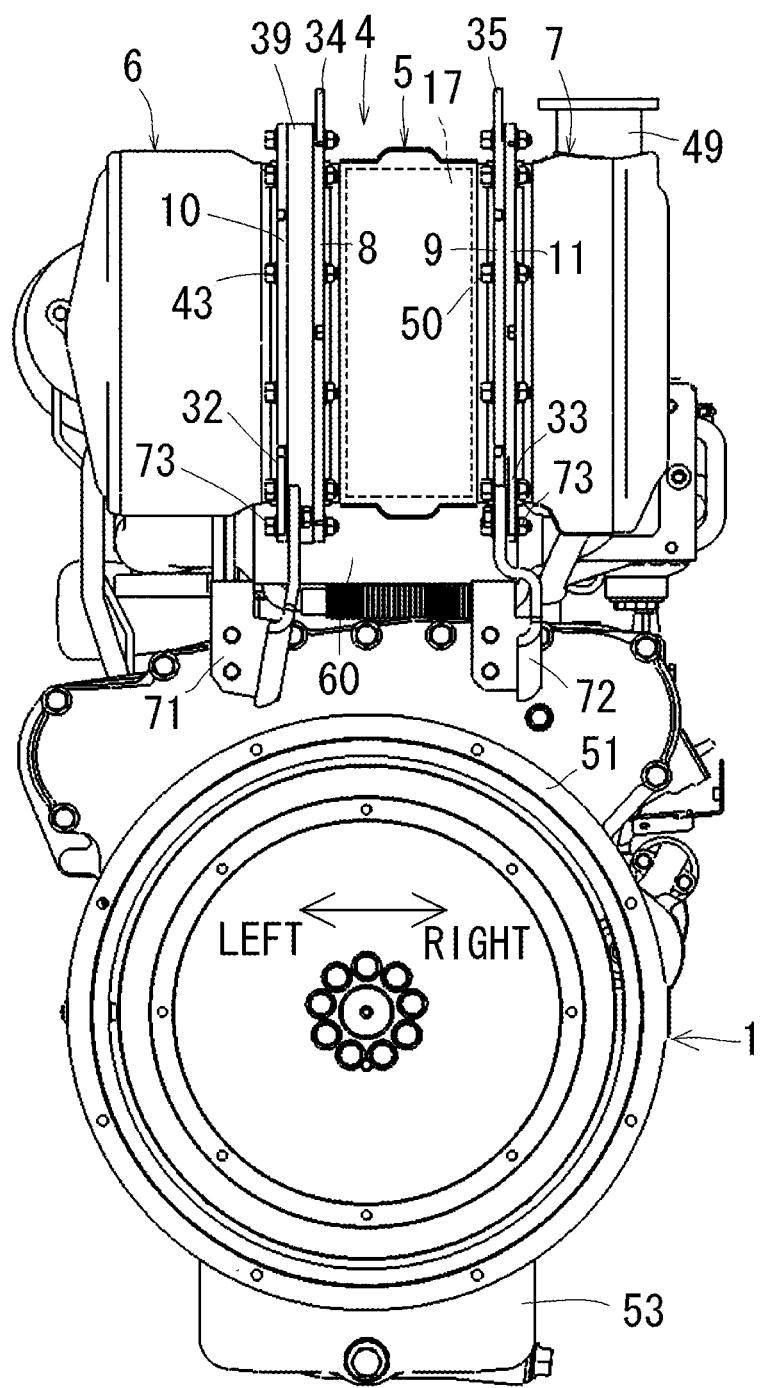
FIG. 30 is a rear view of the engine of FIG. 28.

FIGS. 1 to 30 are diagrams illustrating an engine having an exhaust gas treatment apparatus attached thereto relating to embodiments of the present invention. FIGS. 1 to 13 are diagrams illustrating a first embodiment, FIGS. 14 to 20 are diagrams illustrating a second embodiment, FIGS. 21 to 27 are diagrams illustrating a third embodiment, and FIGS. 28 to 30 are diagrams illustrating a fourth embodiment.

In each of the embodiments, a water-cooled vertical in-line multi-cylinder diesel engine having a DPF muffler attached thereto is described.

The construction of the first embodiment is described below.

Figure 8:
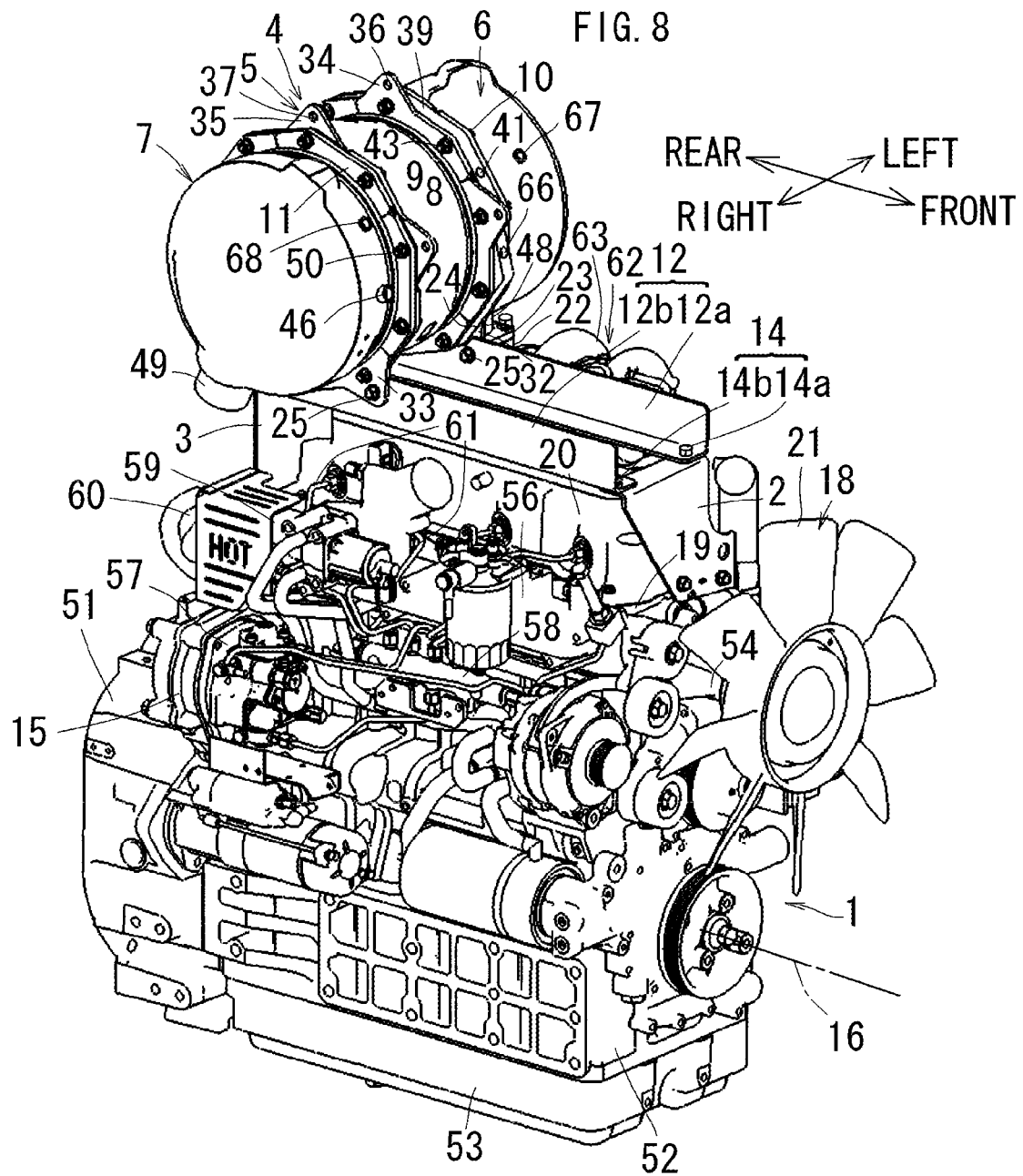
FIG. 8 is a perspective view of the engine having the exhaust gas treatment apparatus attached thereto relating to the first embodiment of the present invention, which is seen from the upper side on the front right side.
Figure 9:
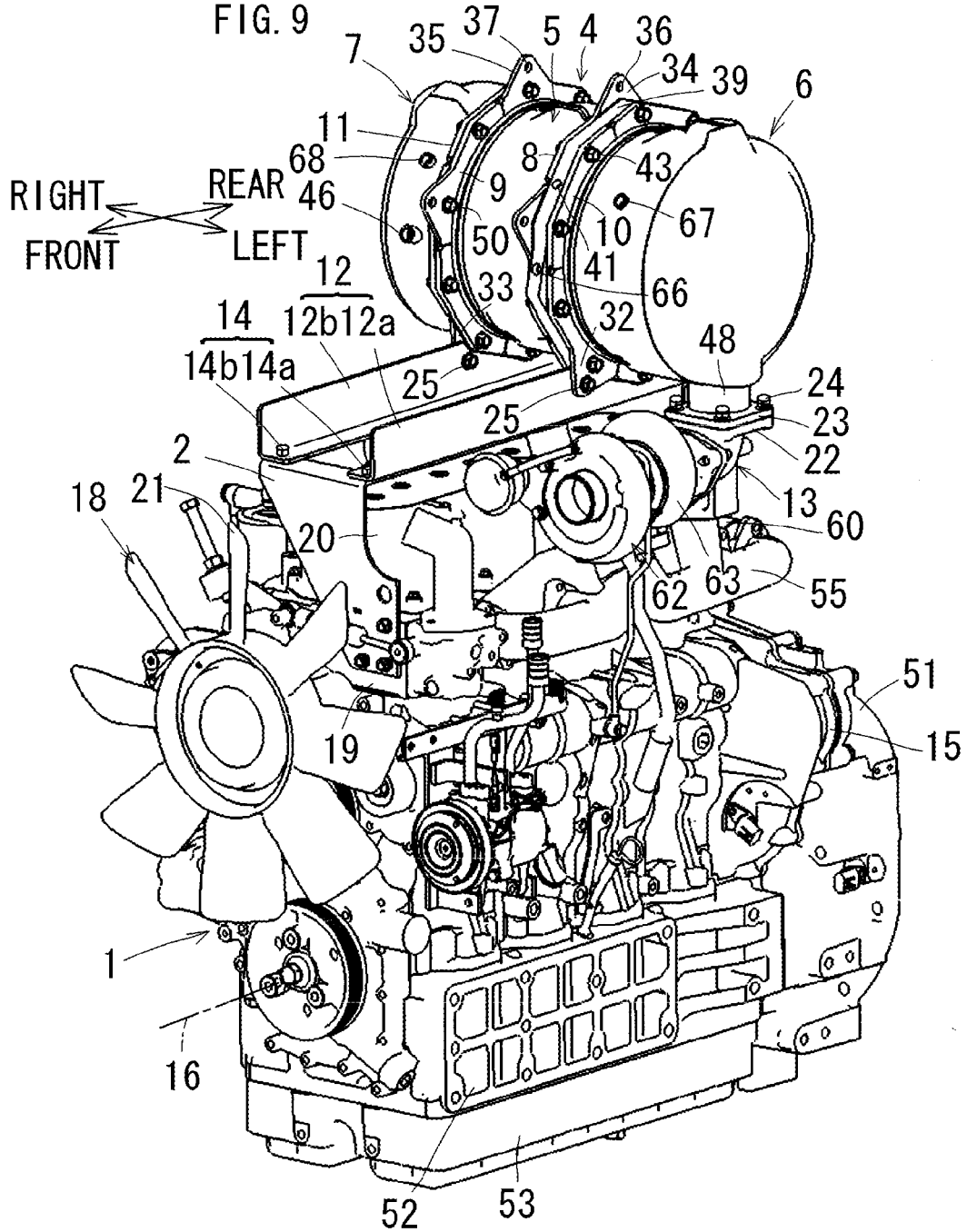
FIG. 9 is a perspective view of the engine, seen from the upper side on the front left side.

As shown in FIG. 8, in the state in which a direction along which a crank shaft center line 16 extends is forward and backward directions and the width direction of an engine body 1 orthogonal to the crank shaft center line 16 is left and right directions, the engine body 1 has a cylinder head 19 attached above a cylinder block 52, a head cover 20 attached above the cylinder head 19, an oil pan 53 attached under the cylinder block 52, a coolant pump 54 attached in front of the cylinder block 52, an engine cooling fan 18 disposed in front of the coolant pump 54, a gear casing 15 disposed in the rear of the cylinder block 52, a flywheel housing 51 disposed in the rear of the gear casing 15, a suction manifold 56 attached on the right side of the cylinder head 19, and an exhaust manifold 55 attached on the left side of the cylinder head 19 as shown in FIG. 9.

As shown in FIG. 8, the engine cooling fan 18 is disposed in the input axis of the coolant pump 54, and the coolant pump 54 and the engine cooling fan 18 are driven by a belt transmission device from the crank shaft.

The engine body 1 is equipped with an EGR apparatus (i.e., exhaust gas recirculation system) and a common rail fuel injection system. The EGR apparatus reduces some of an exhaust gas into a suction gas. The common rail fuel injection system accumulates fuel, boosted by the fuel supply pump 57, in a common rail 58 and controls a fuel injection time or a fuel injection amount of each cylinder by opening or closing the electromagnetic valve of an injector through electronic control.

Figure 10:
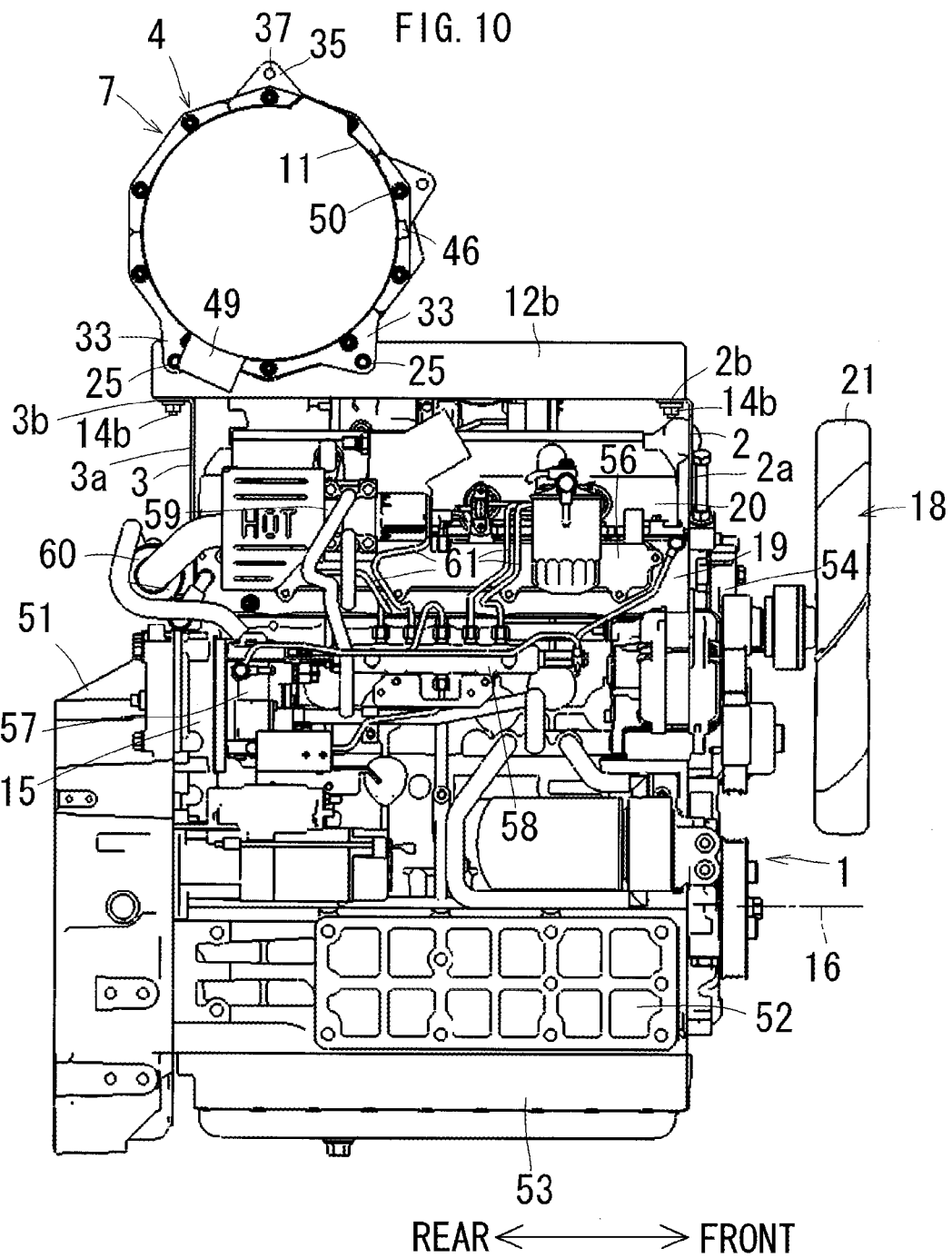
FIG. 10 is a lateral view of the engine of FIG. 8, seen from the right side.
Figure 11:
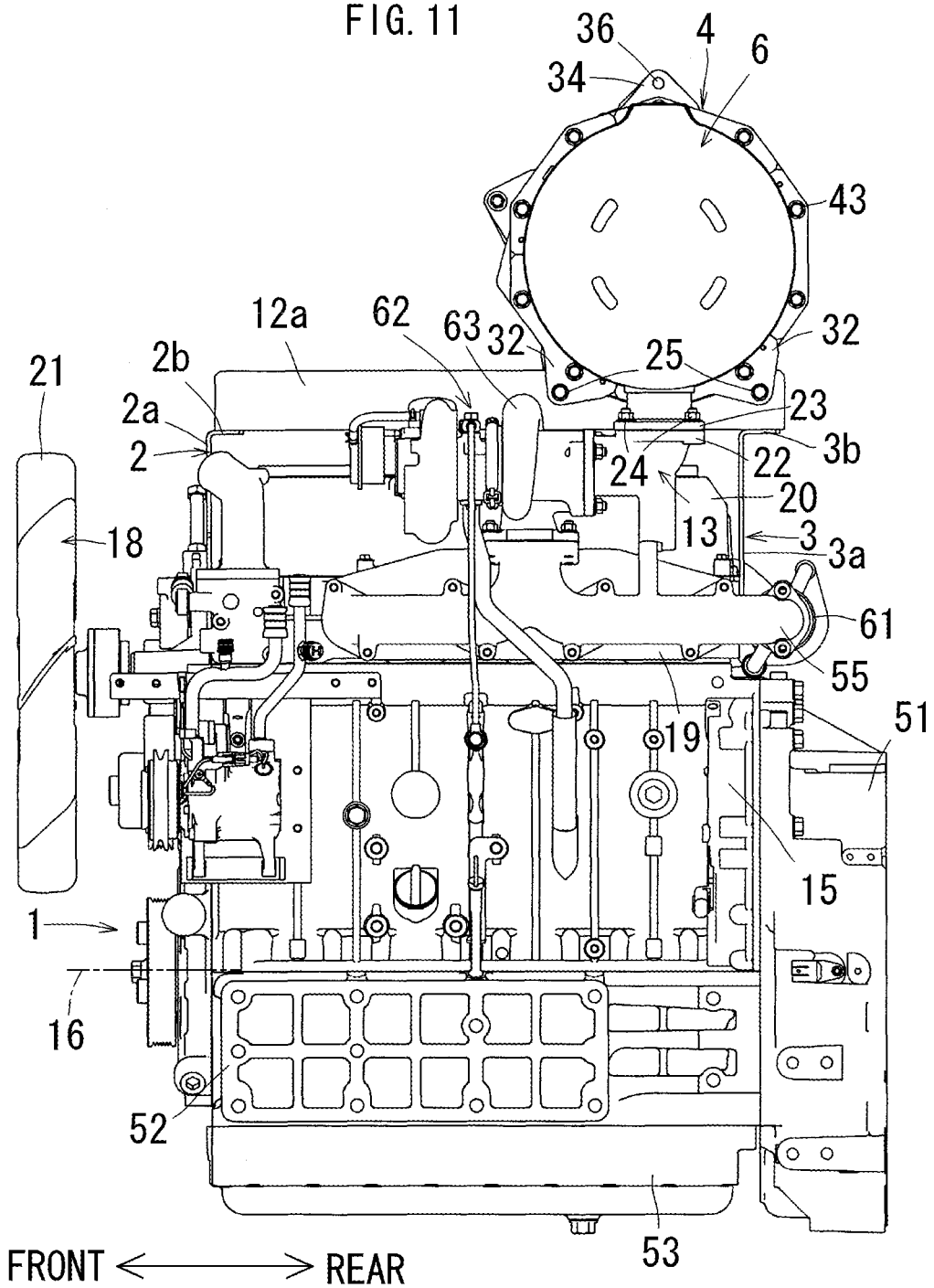
FIG. 11 is a lateral view of the engine of FIG. 8, seen from the left side.
Figure 12:
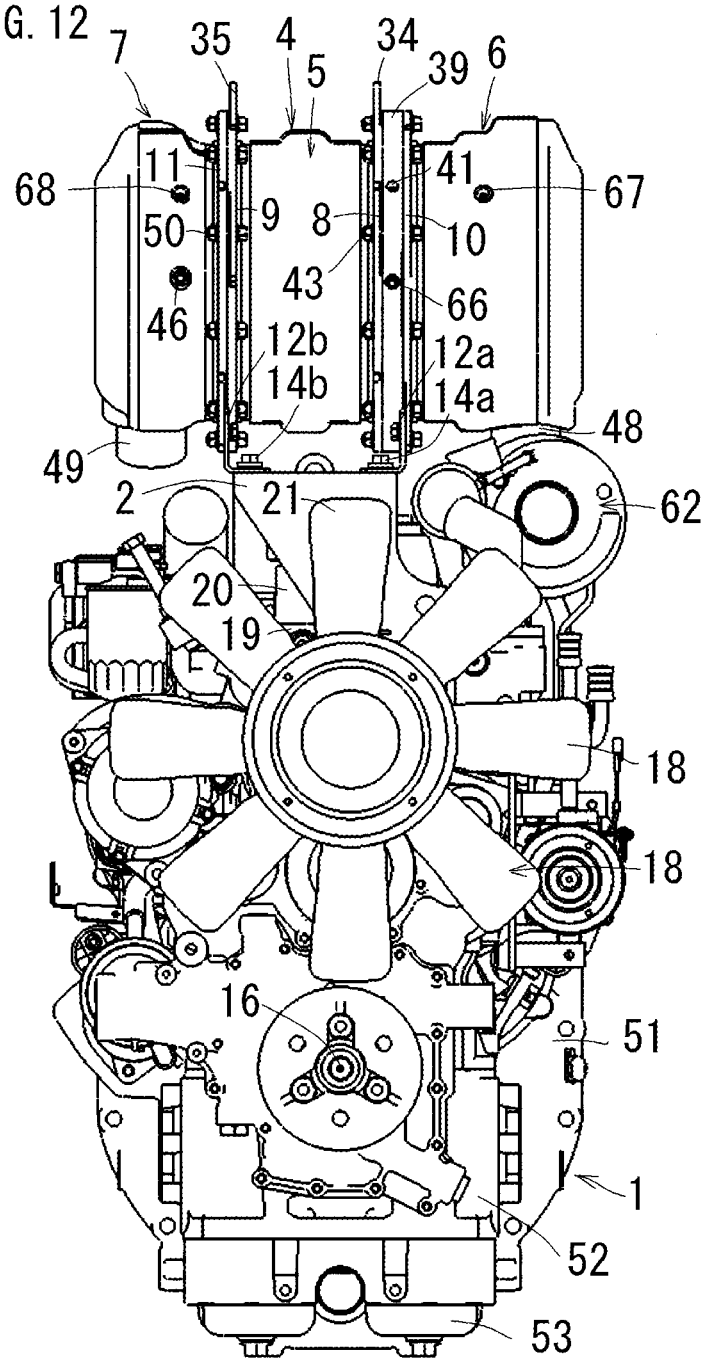
FIG. 12 is a front view of the engine of FIG. 8.
Figure 13:
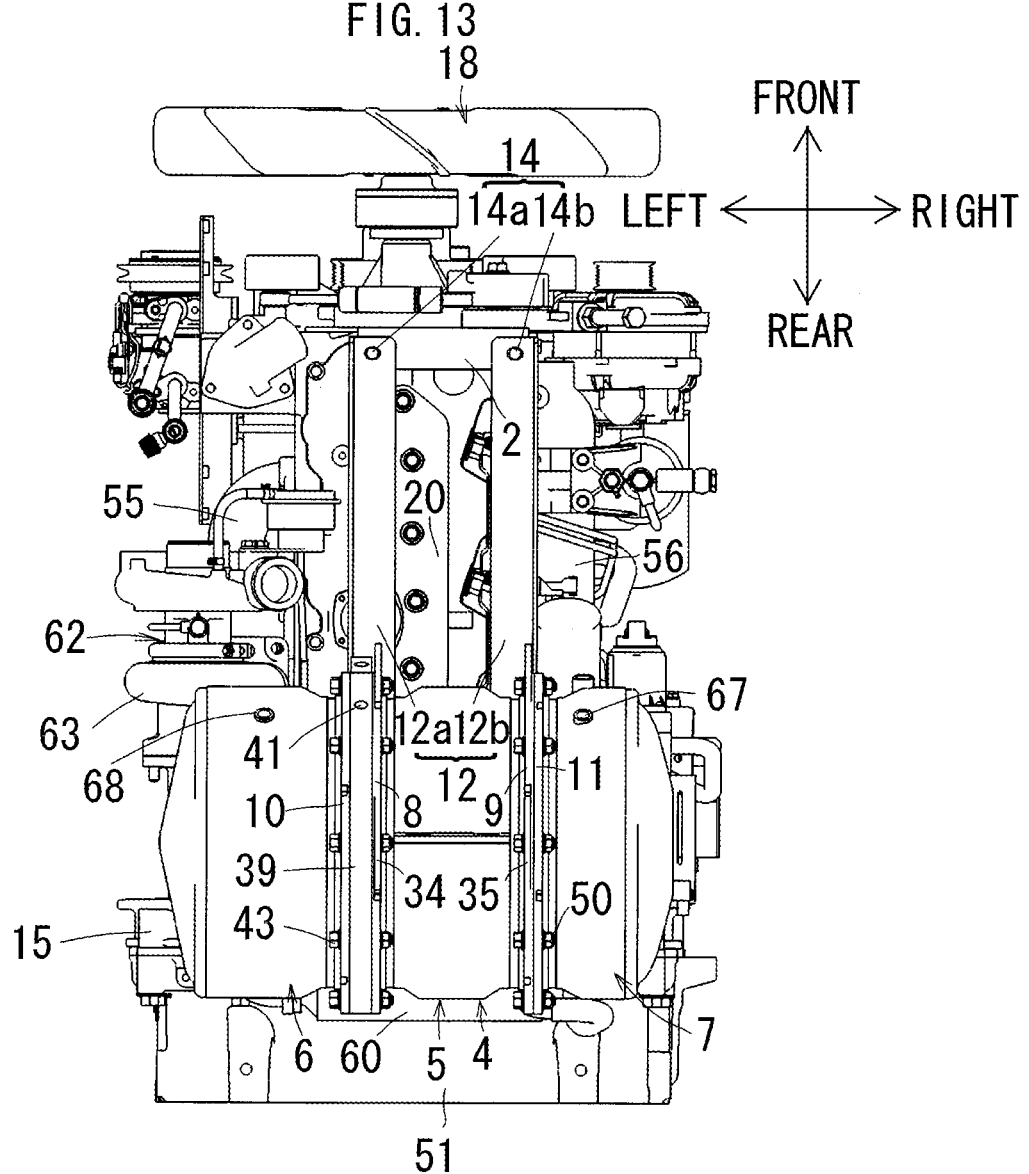
FIG. 13 is a plan view of the engine of FIG. 8.

As shown in FIG. 8, in the EGR apparatus, an EGR valve casing 59 is attached above the suction manifold 56 and configured to communicate with the exhaust manifold 55 through an EGR cooler 60. As shown in FIG. 10, the EGR cooler 60 is disposed immediately after the cylinder head 19 and immediately above a flywheel housing 51.

As shown in FIG. 8, the common rail fuel injection system is configured to have the common rail 58 disposed under the suction manifold 56 and to pump fuel from a fuel supply pump 57 to the common rail 58 and supply fuel, compressed by the common rail 58, to the injector through the high pressure pipe 61. The fuel supply pump 57 is disposed on the front side of the gear casing 15 in the right direction of the cylinder block 52.

As shown in FIG. 9, an exhaust gas treatment apparatus 4 is supported by the engine body 1, and the engine body 1 and the exhaust gas treatment apparatus 4 are configured to communicate with each other through an exhaust pipe 13.

A super charger 62 is attached above the exhaust manifold 55, and the exhaust pipe 13 of an elbow form is coupled to the exhaust outlet of an exhaust turbine 63 of the super charger 62.

As shown in FIG. 3, a DOC 64 and a DPF 17 are accommodated in the exhaust gas treatment apparatus 4. The DOC 64 is disposed on the upper stream side of the exhaust gas treatment apparatus 4, and the DPF 17 is disposed on the lower stream side thereof.

The DOC is an abbreviation of a diesel oxidization catalyst, and the DPF is an abbreviation of a diesel particulate filter.

In the exhaust gas treatment apparatus 4, the DPF 17 is configured to capture PM (particle materials) included in an exhaust gas, oxidize non-combustion fuel, drained out from a combustion chamber or sprayed to an exhaust path, using the DOC 64, raise temperature of the exhaust gas using oxidization heat, and incinerate the PM accumulated in the DPF 17 using the raised temperature, thereby contriving the regeneration of the DPF 17.

The DPF muffler is used in the exhaust gas treatment apparatus 4 in the present embodiment, but an exhaust muffler or a catalyst converter which does not include the DPF may be used as the exhaust gas treatment apparatus 4.

As shown in FIG. 3, the casing of the exhaust gas treatment apparatus 4 consists of a plurality of casing units 5, 6, and 7 which can be separated from each other. Connection flanges 8, 9, 10, and 11 are installed at the end of each of the casing units 5, 6, and 7. The casing units 5, 6, and 7 are coupled by a connection of the connection flanges 8, 9, 10, and 11.

As shown in FIG. 8, the exhaust gas treatment apparatus 4 is supported by the engine body 1 through the connection flanges 8, 9, 10, and 11.

As shown in FIG. 3, the casing of the exhaust gas treatment apparatus 4 consists of three casing units; the DPF accommodation casing unit 5, the exhaust inlet-side casing unit 6, and the exhaust outlet-side casing unit 7.

The DPF accommodation casing unit 5 accommodates the DPF 17, and the exhaust inlet-side casing unit 6 accommodates the DOC 64.

The DPF inlet-side connection flange 8 and the DPF outlet-side connection flange 9 are disposed on both ends of the DPF accommodation casing unit 5. The exhaust inlet-side connection flange 10 is disposed at the end of the DPF inlet side of the exhaust inlet-side casing unit 6, and the exhaust outlet-side connection flanges 11 is disposed at the end of the DPF outlet side of the exhaust outlet-side casing unit 7.

Between the DPF inlet-side connection flange 8 and the exhaust inlet-side connection flange 10, a ring-shaped spacer 39 is inserted, and the connection flanges 8 and 10 and the ring-shaped spacer 39 are overlapped with each other and fastened by flange connection fastening members 43 on the DPF inlet side.

Furthermore, the DPF outlet-side connection flange 9 and the exhaust outlet-side connection flange 11 are overlapped with each other and fastened by flange connection fastening members 50 on the DPF outlet side.

All the flange connection fastening members 43 and 50 are bolts and nuts.

As shown in FIG. 8, the exhaust gas treatment apparatus 4 is supported by the engine body 1 through the plurality of connection flanges 8, 9, 10, and 11 which are spaced apart from each other.

The plurality of connection flanges 8, 9, 10, and 11 includes the DPF inlet-side connection flange 8 and the DPF outlet-side connection flange 9 of the DPF accommodation casing unit 5, the exhaust inlet-side connection flange 10 of the exhaust inlet-side casing unit 6, and the exhaust outlet-side connection flange 11 of the exhaust outlet-side casing unit 7.

As shown in FIG. 8, support stays 2 and 3 are installed in the engine body 1, a support bracket 12 is attached to the connection flanges 10 and 11, and the support bracket 12 is disposed above the support stays 2 and 3.

The load of the exhaust gas treatment apparatus 4 is supported by the support stays 2 and 3 through the support bracket 12, and the support bracket 12 is installed in the support stays 2 and 3 using bracket installation fastening members 14.

As shown in FIG. 8, the support stays 2 and 3 consist of the front and rear support stays 2 and 3, the front and rear support stays 2 and 3 are installed on the front and back sides of the engine body 1, the support bracket 12 is lengthily formed forward and backward, the support bracket 12 is disposed between the front and rear support stays 2 and 3, and the exhaust gas treatment apparatus 4 is supported by the engine body 1 through the front and rear support stays 2 and 3 in a long posture in the left and right directions.

As shown in FIG. 1(A), the support bracket 12 consists of support brackets 12*a* and 12*b* on the left and right sides, and the support brackets 12*a* and 12*b* are respectively attached to the connection flanges 8, 10 and 9, 11 on the left and right sides.

The front and rear ends of the support brackets 12*a* and 12*b* are disposed on the front and rear support stays 2 and 3 and fastened by bracket installation fastening members 14*a* and 14*b* on the left and right sides.

As shown in FIG. 2(A), the front support stay 2 is formed by bending a horizontal placement unit 2*b* from the upper end of a vertical stay installation unit 2*a* toward the back side. Furthermore, the rear support stay 3 is formed by bending a horizontal placement unit 3*b* from the upper end of a vertical stay installation unit 3*a* toward the back side.

As shown in FIG. 10, the stay installation units 2*a* and 3*a* of the respective front and rear support stays 2 and 3 are installed in the front and rear end faces of the cylinder head 19.

As shown in FIG. 2(B), the support bracket 12*a* on the left side is formed by bending a vertical support unit 12*d* from the left edge of a horizontal bracket installation unit 12*c* toward an upper side. The right support bracket 12*b* is formed by bending a vertical support unit 12*d* from the right edge of a horizontal bracket installation unit 12*c* toward an upper side.

As shown in FIGS. 1(A) and 1(C), the front end portions of the bracket installation units 12*c* and 12*c* of the support brackets 12*a* and 12*b* on the left and right sides are placed on the placement unit 2*b* of the front support stay 2. The front end portions are fastened by the bracket installation fastening members 14*a* and 14*b* on the left and right sides.

As shown in FIGS. 2(A) and 2(B), the rear end portions of the bracket installation units 12*c* and 12*c* of the support brackets 12*a* and 12*b* on the left and right sides are placed on the placement unit 3*b* of the rear support stay 3. The rear end portions are fastened by the bracket installation fastening members 14*a* and 14*b* on the left and right sides.

The bracket installation fastening members 14*a* and 14*b* are bolts and nuts.

As shown in FIG. 10, on the upper side of the head cover 20 attached above the cylinder head 19, the exhaust gas treatment apparatus 4 is disposed in a place higher than the upper end portion 21 of the engine cooling fan 18.

As shown in FIG. 9, the exhaust inlet flange 23 of the exhaust gas treatment apparatus 4 is placed on the engine exhaust outlet flange 22 on the side of the engine body 1.

The engine exhaust outlet flange 22 is formed toward the upper side of the end of the exhaust pipe 13. The exhaust inlet flange 23 is formed toward the lower side of the leading end of the exhaust inlet pipe 48 of the exhaust gas treatment apparatus 4.

As shown in FIGS. 1(A) and 1(B), the support brackets 12*a* and 12*b* on the left and right sides are attached to the connection flanges 10 and 11 using bracket installation fastening members 25. The position adjustment holes 26 of the bracket installation fastening members 25 are formed in at least one of the connection flanges 10 and 11 and the support brackets 12*a* and 12*b*. The positions of at least upper and lower directions of the bracket installation fastening members 25 are adjusted by the position adjustment holes 26.

As shown in FIG. 2(B), in the present embodiment, the support brackets 12*a* and 12*b* on the left and right sides are respectively attached to the exhaust inlet-side connection flange 10 of the exhaust inlet-side casing unit 6 and the exhaust outlet-side connection flange 11 of the exhaust outlet-side casing unit 7. The position adjustment holes 26 of the bracket installation fastening members 25 are formed in the support brackets 12a and 12b.

As shown in FIG. 1(B), the position adjustment hole 26 of the bracket installation fastening member 25 is a large-diameter hole 27. The large-diameter holes 27 are formed in one of the connection flanges 10 and 11 and the support bracket 12, and small-diameter holes 28 are formed in the other of the connection flanges 10 and 11 and the support bracket 12. The inside diameter of the large-diameter hole 27 is set to a size in which a portion through which the bracket installation fastening member 25 inserted therein passes can be moved and adjusted in a direction orthogonal to the direction in which the bracket installation fastening member 25 passes. The inside diameter of the small-diameter hole 28 is set to a size in which a portion through which the bracket installation fastening member 25 inserted therein passes cannot be moved and adjusted in a direction orthogonal to the direction in which the bracket installation fastening member 25 passes.

In the state in which the width direction of the engine body 1 is left and right directions, the large-diameter hole 27 and the small-diameter hole 28 overlap with each other left and right, and the bracket installation fastening member 25 is inserted into the overlapping position and passes through the overlapping position.

As shown in FIGS. 1(A) and 1(C), the support brackets 12a and 12b are attached to the support stays 2 and 3 using the bracket installation fastening members 14a and 14b. The position adjustment holes 29 of the bracket installation fastening members 14a and 14b are formed in at least one of the support brackets 12a and 12b and the support stays 2 and 3. The positions of at least the forward and backward directions and left and right directions of the bracket installation fastening members 14a and 14b are adjusted through the position adjustment holes 29.

As shown in FIG. 1(C), in the present embodiment, the position adjustment holes 29 are formed in the front end portion of the support bracket 12a on the left side and in the front support stay 2 on both sides of the left side. The positions of the forward and backward directions and the left and right directions of the bracket installation fastening members 14a on the left side are adjusted through the position adjustment holes 29. The rear end portion of the support bracket 12a on the left side, the front and rear end portions of the support bracket 12b of the left and right sides of the rear support stay 3, and the right side of the pair of front and rear support stays 2 and 3 have the same construction. The positions of the forward and backward directions and the left and right directions of the bracket installation fastening members 14a and 14b are adjusted through the position adjustment holes 29.

As shown in FIG. 1(C), the position adjustment holes 29 of the bracket installation fastening members 14a and 14b consist of a long hole 30 in the forward and backward directions and a long hole 31 in the left and right directions. The long holes 30 of the forward and backward directions are formed in one of the support stays 2 and 3 and the support brackets 12a and 12b, and the long holes 31 of the left and right directions are formed in the other of the support stays 2 and 3 and the support brackets 12a and 12b.

The long holes 30 of the forward and backward directions and the long holes 31 of the left and right directions overlap with each other up and down in a crossing form. The bracket installation fastening members 14a and 14b are inserted into the overlapping positions and configured to pass therethrough.

As shown in FIG. 1(C), in the present embodiment, the long holes 30 of the forward and backward directions are formed in the support stays 2 and 3 on the front and back sides, and the long holes 31 of the left and right directions are formed in the support brackets 12a and 12b on the left and right sides.

As shown in FIG. 3, the DPF 17 is accommodated in the exhaust gas treatment apparatus 4. The casing of the exhaust gas treatment apparatus 4 is formed of the DPF accommodation casing unit 5, the exhaust inlet-side casing unit 6, and the exhaust outlet-side casing unit 7.

The exhaust inlet-side casing unit 6 and the exhaust outlet-side casing unit 7 are connected to both ends of the DPF accommodation casing unit 5 so that they can be separated from each other.

As shown in FIG. 2(B), the connection flanges 8 and 9 of the DPF accommodation casing unit 5 overlap with the respective connection flanges 10 and 11 of the exhaust inlet-side casing unit 6 and the exhaust outlet-side casing unit 7. Support protrusions 32 and 33 are outwardly more protruded than the respective connection flanges 8 and 9 of the DPF accommodation casing unit 5 in the diameter direction and formed in the respective connection flanges 10 and 11 of the exhaust inlet-side casing unit 6 and the exhaust outlet-side casing unit 7. The exhaust gas treatment apparatus 4 is supported by the engine body 1 through the support protrusions 32 and 33.

As shown in FIG. 1(A), in the state in which the exhaust inlet-side casing unit 6 and the exhaust outlet-side casing unit 7 are supported by the engine body 1, the DPF accommodation casing unit 5 can be pulled out between the exhaust inlet-side casing unit 6 and the exhaust outlet-side casing unit 7.

Figure 4C:
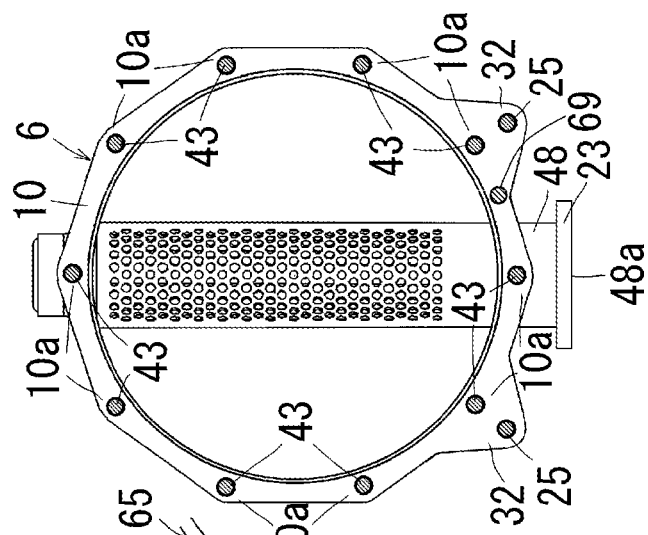
FIGS. 4(A), 4(B), and 4(C) are diagrams illustrating the exhaust gas treatment apparatus of FIG. 1(A).
Figure 4B:
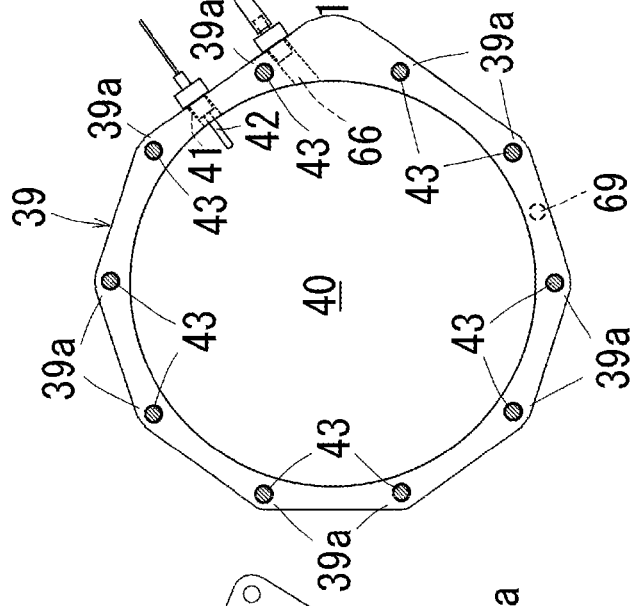

As shown in FIGS. 4(B) and 4(C), the ring-shaped spacer 39 is detachably installed in the exhaust inlet-side connection flange 10 of the exhaust inlet-side casing unit 6 using an installation bolt 69. However, the ring-shaped spacer 39 is not detached from the exhaust inlet-side connection flange 10 when the DPF accommodation casing unit 5 is pulled out between the exhaust inlet-side casing unit 6 and the exhaust outlet-side casing unit 7.

As shown in FIG. 1(A), pull-up protrusions 34 and 35 are outwardly more protruded than the connection flanges 10 and 11 of the exhaust inlet-side casing unit 6 and the exhaust outlet-side casing unit 7 in the diameter direction and installed in the respective connection flanges 8 and 9 of the DPF accommodation casing unit 5. The pull-up locking units 36 and 37 of the DPF accommodation casing unit 5 are installed in the respective pull-up protrusions 34 and 35.

As shown in FIGS. 2(A) and 2(B), a flange-fit concave unit 38b having an upper portion opened is formed in the support bracket 12b on the right side. The lower edge portion of at least one of the connection flanges 9 and 11 at which the DPF accommodation casing unit 5 and the exhaust outlet-side casing unit 7 overlap with each other is fitted into the flange-fit concave unit 38b.

As shown in FIG. 3, in the present embodiment, the lower edge portions of both sides of the connection flanges 9 and 11 of the DPF accommodation casing unit 5 and the exhaust outlet-side casing unit 7 are fitted into the flange-fit concave unit 38b.

As shown in FIG. 2(B), a flange-fit concave unit 38a having an upper portion opened is also formed in the support bracket 12a on the left side. The lower edge portion of at least one of the connection flange 10 of the exhaust inlet-side casing unit 6 and the ring-shaped spacer 39 which overlap with each other is fitted into the flange-fit concave unit 38a.

The inner peripheral edges of the flange-fit concave units 38a and 38b are formed in a curved shape along the connection flanges 9, 10, and 11 of a polygon or the intersecting corner of a lower edge portion of the ring-shaped spacer 39. Since the lower edge portions are fitted into the flange-fit concave units 38a and 38b as described above, the position of the exhaust gas treatment apparatus 4 in the forward and backward directions and the rotation and posture of the exhaust gas treatment apparatus 4 are determined.

As shown in FIG. 3, the ring-shaped spacer 39 is inserted between the connection flanges 8 and 10 of the DPF accommodation casing unit 5 and the exhaust inlet-side casing unit 6, and DPF inlet-side space 40 is formed in the ring-shaped spacer 39.

As shown in FIG. 4(B), a sensor installation hole 41 is formed in the ring-shaped spacer 39. An exhaust sensor 42 is inserted from the sensor installation hole 41 toward the DPF inlet-side space 40.

The exhaust sensor 42 is an exhaust temperature sensor on the DPF inlet side.

As shown in FIG. 4(B), a pipe installation hole 66 in which the DPF inlet-side exhaust pressure entrance pipe 65 of an exhaust pressure sensor 44 shown in FIG. 1(A) is installed is formed in the ring-shaped spacer 39. The pipe installation hole 66 is upwardly formed externally so that condensation water within the DPF inlet-side space 40 does not flow into the DPF inlet-side exhaust pressure entrance pipe 65.

Figure 4A:
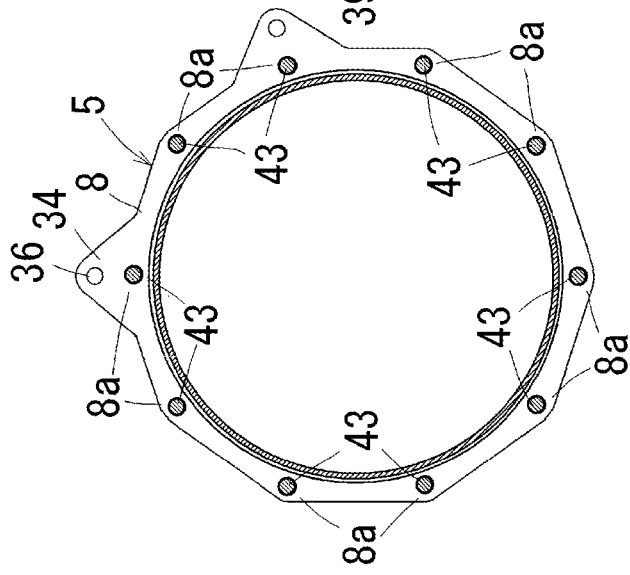

As shown in FIGS. 4(A) and 4(C), a plurality of locked units 8a and 10a is disposed in the respective connection flanges 8 and 10 where the DPF accommodation casing unit 5 and the exhaust inlet-side casing unit 6 overlap with each other and arranged in their circumferential direction at equally spaced angles.

As shown in FIG. 4(B), a plurality of locked units 39a is disposed in the ring-shaped spacer 39 and arranged in their circumferential direction at equally spaced angles. The posture of the ring-shaped spacer 39 is moved in the circumferential direction in the unit of the equally spaced angle, and the locked units 39a of the ring-shaped spacer 39 are aligned with the respective locked units 8a and 10a of the connection flanges 8 and 10. In this state, if the locked units 8a and 10a of the connection flanges 8 and 10 are locked into the locked units 39a of the ring-shaped spacer 39 using the flange connection fastening members 43, the posture of the ring-shaped spacer 39 can be changed in the circumferential direction and thus the position and posture of the sensor installation hole 41 can be changed.

As shown in FIG. 6(C), a pipe installation boss 46, in which the exhaust pressure entrance pipe 45 of the exhaust pressure sensor 44 is installed, is disposed in the peripheral wall of the exhaust outlet-side casing unit 7. The boss hole 47 of the pipe installation boss 46 is upwardly formed externally.

As shown in FIG. 1(A), the exhaust pressure entrance pipe 45 is disposed on the DPF outlet side and configured to communicate with the exhaust pressure entrance pipe 65 on the DPF inlet side and the exhaust pressure sensor 44. The exhaust pressure sensor 44 detects a difference in the pressure between the inlet side and the outlet side of the DPF 17. An engine ECU estimates the amount of PM accumulated in the DPF 17 on the basis of the detection value. The ECU is an abbreviation of an electronic control unit.

As shown in FIG. 4(C), an exhaust inlet pipe 48 is installed in the exhaust inlet-side casing unit 6.

The plurality of locked units 8a and 10a is disposed in the connection flanges 8 and 10 where the DPF accommodation casing unit 5 and the exhaust inlet-side casing unit 6 overlap with each other and arranged in their circumferential direction at equally spaced angles.

The exhaust inlet-side casing unit 6 is moved in the circumferential direction in the unit of the equally spaced angle. The locked units 10a of the connection flange 10 of the exhaust inlet-side casing unit 6 are aligned with the respective locked units 8a of the connection flange 8 of the DPF accommodation casing unit 5 and then fastened using the flange connection fastening members 43. Accordingly, the posture of the exhaust inlet-side casing unit 6 can be changed in the circumferential direction, and thus the direction of an inlet 48a of the exhaust inlet pipe 48 can be changed.

As shown in FIGS. 4(A) and 4(C), the bolt insertion through holes of the flange connection fastening members 43 are formed in the locked units 8a and 10a. The bolt insertion through holes of the flange connection fastening members 43 are spaced apart from each other at equal angles of 36° and formed at 10 places in the circumferential direction.

As shown in FIG. 1(A), the sensor installation hole 67 for an exhaust sensor is formed in the peripheral wall of the exhaust inlet-side casing unit 6. An exhaust gas temperature sensor for detecting the temperature of an exhaust gas on the upper stream side of the DOC is disposed in the sensor installation hole 67.

As shown in FIGS. 5(A) and 5(B), an exhaust outlet pipe 49 is installed in the exhaust outlet-side casing unit 7. A plurality of locked units 11a and 9a is disposed in each of the connection flanges 11 and 9 where the exhaust outlet-side casing unit 7 and the DPF accommodation casing unit 5 overlap with each other and arranged in their circumferential direction at equally spaced angles.

The exhaust outlet-side casing unit 7 is moved in the circumferential direction in the unit of the equally spaced angle, and the locked units 11a of the connection flange 11 of the exhaust outlet-side casing unit 7 are aligned with the respective locked units 9a of the connection flange 9 of the DPF accommodation casing unit 5 and then fastened using respective flange connection fastening members 50. Accordingly, the posture of the exhaust outlet-side casing unit 7 can be changed in the circumferential direction, and the direction of an outlet 49a of the exhaust outlet pipe 49 can be changed.

As shown in FIGS. 5(A) and 5(B), the bolt insertion through holes of the flange connection fastening members 50 are formed in the locked units 11a and 9a. The bolt insertion through holes of the flange connection fastening members 50 are spaced apart from each other at equal angles of 36° and formed at 10 places in the circumferential direction.

As shown in FIG. 1(A), a sensor installation hole 68 for an exhaust sensor is formed in the peripheral wall of the exhaust outlet-side casing unit 7. An exhaust gas temperature sensor for detecting the temperature of an exhaust gas on the lower stream side of the DPF can be disposed in the sensor installation hole 68.

Second and third embodiments shown in FIGS. 14 to 27 relate to a diesel engine having an exhaust gas treatment apparatus attached thereto, which is specialized for a tractor. The diesel engine is mounted on the following tractor vehicle 102.

Figure 20:
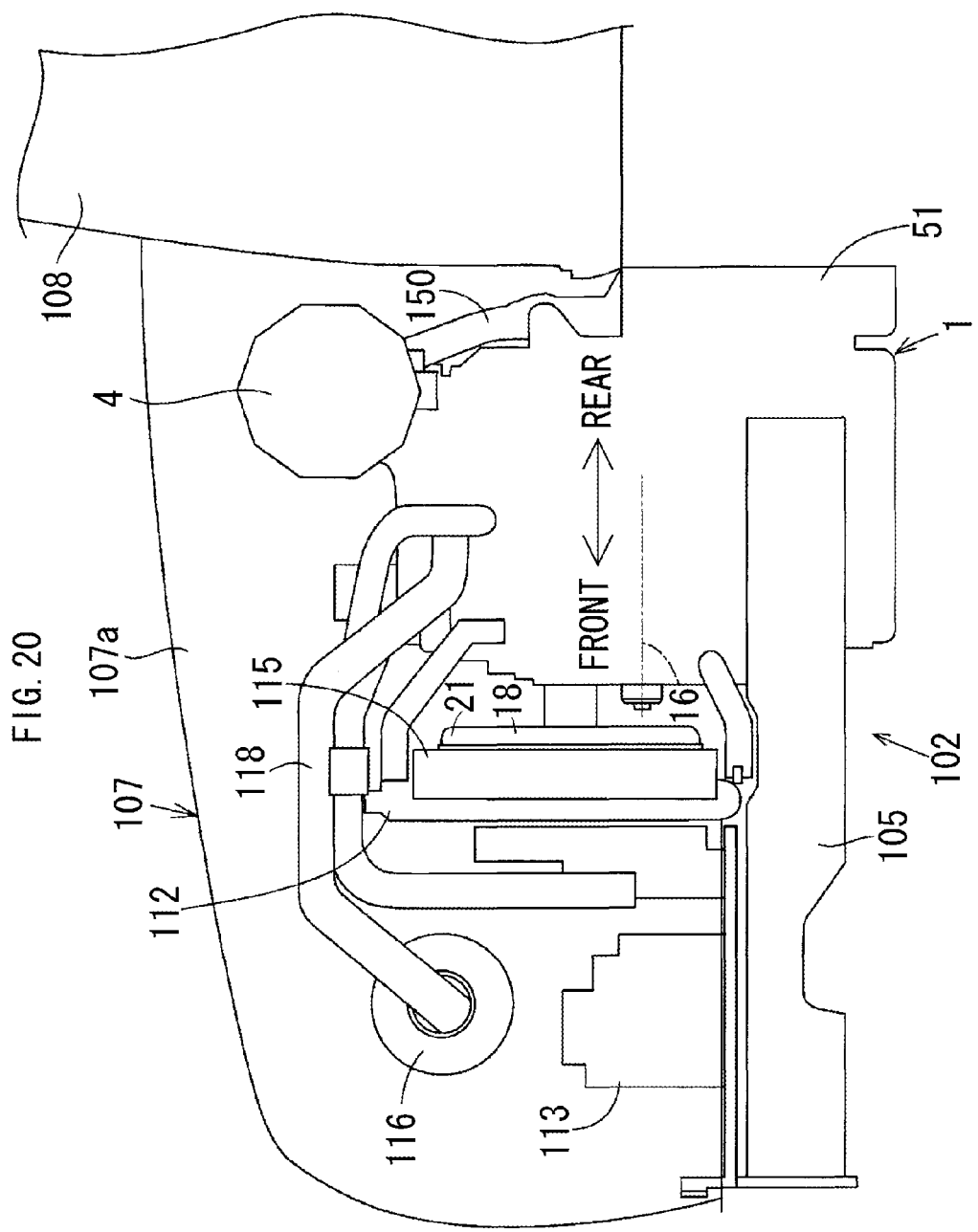
FIG. 20 is a diagram showing a tractor with the engine of FIG. 14.
Figure 21:
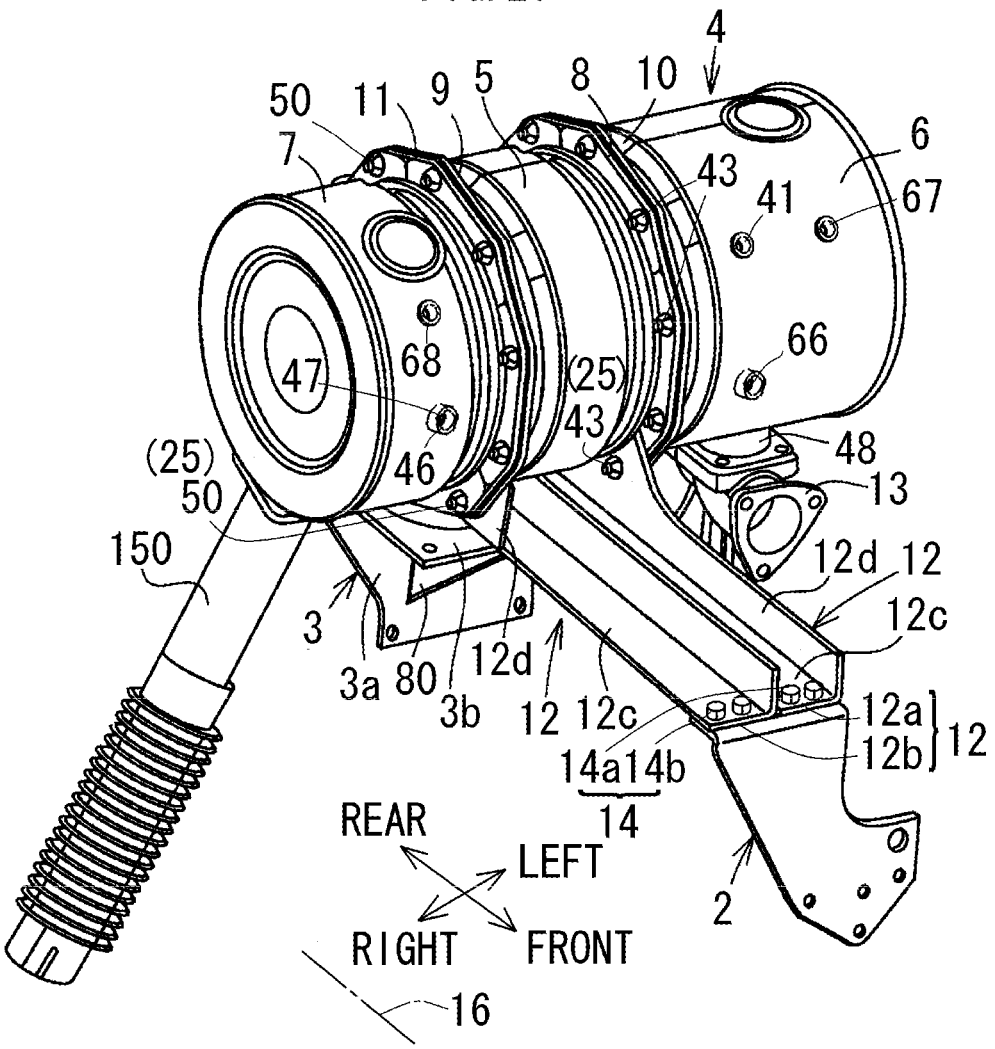
FIG. 21 is a perspective view of an engine having an exhaust gas treatment apparatus attached thereto according to a third embodiment of the present invention, which is seen from the upper side on the front right side.

As shown in FIG. 20, the tractor vehicle 102 includes an engine body 1, a clutch housing, a transmission casing, a front axle frame 105, and so on which are coupled in series. A bonnet 107 is formed to generally surround various equipments attached to its peripherals, engine auxiliary equipments, etc. starting from the engine body 1. The ceiling unit 107a of the bonnet 107 is configured to be the highest in its back part and lowered in its front part. That is, the ceiling unit 107a is disposed in a tilt fashion in which the back part becomes gradually high from the front part to the back part.

Furthermore, as shown in FIG. 20, a cabin 108 is disposed above the tractor vehicle 102 in the back side of the engine body 1, and a cockpit having a handle and a driver's seat disposed therein is formed in the cabin 108.

The engine body 1 has a crank shaft center line 16 disposed in the forward and backward directions. An engine cooling fan 18, a radiator 112, a battery 113, and the like are disposed above the front axle frame 105 in front of the engine body 1.

As shown in FIG. 20, a shroud 115 of a cylindrical shape is backwardly protruded in the radiator 112. The front part of the engine cooling fan 18 is disposed within the shroud 115. Furthermore, an air cleaner 116 is disposed above the battery 113. A clean air suction pipe 118 led out from the air cleaner 116 is coupled to the suction manifold 56 of the engine body 1 shown in FIG. 18 so that it communicates therewith.

The construction of the second embodiment shown in FIGS. 14 to 20 is described below.

Figure 15:
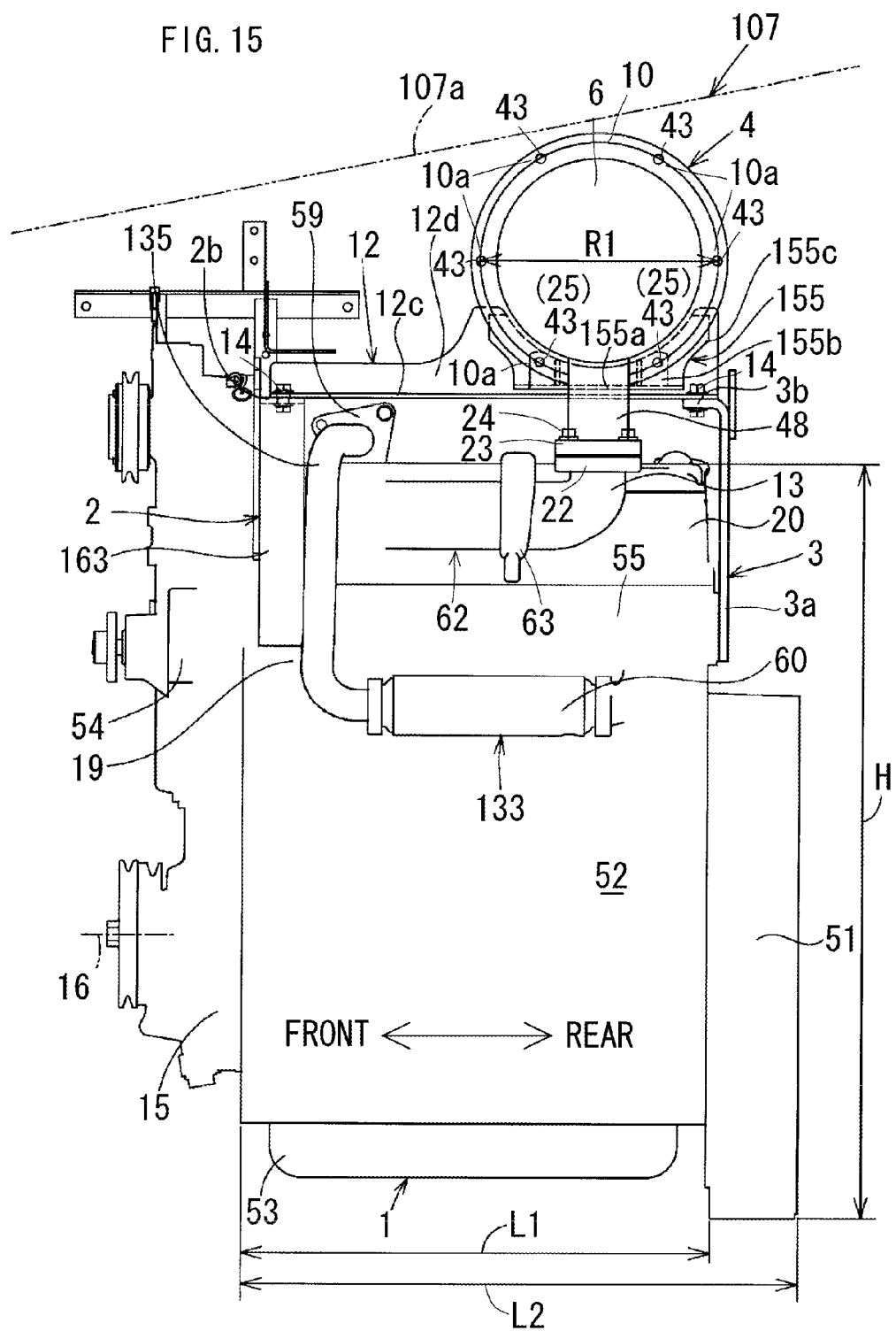
FIG. 15 is a lateral view of the engine of FIG. 14, seen from the left side.
Figure 18:
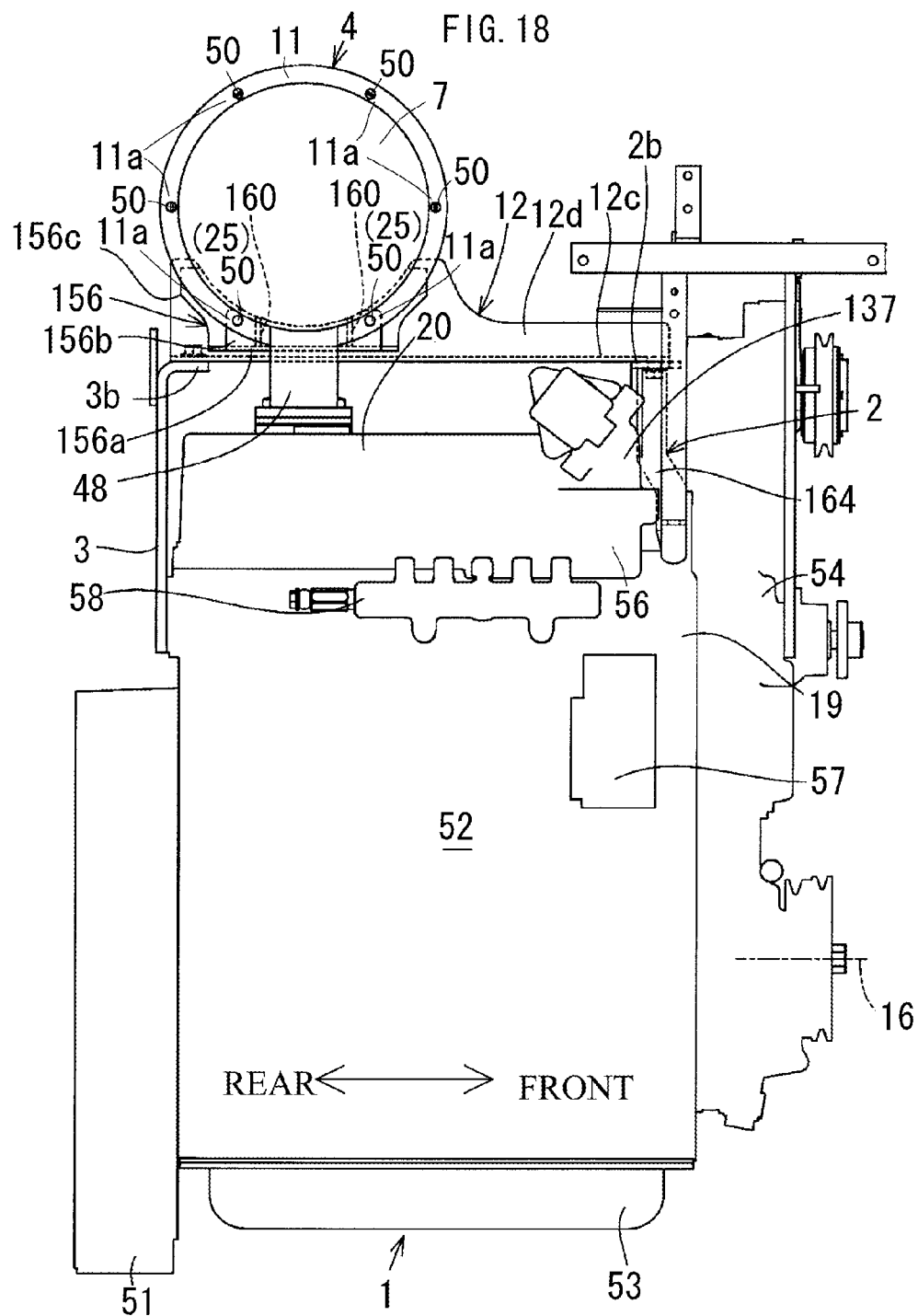
FIG. 18 is a lateral view of the engine of FIG. 14, seen from the right side.

As shown in FIG. 15, the EGR apparatus has an EGR cooler 60 and an EGR gas lead-out pipe 135 disposed in an EGR gas lead-out passage 133 and an EGR valve casing 59 disposed on the down stream side of the EGR gas lead-out pipe 135. As shown in FIG. 18, an EGR gas inlet pipe 137 is led out from the suction manifold 56.

A shown in FIG. 15, an exhaust gas treatment apparatus 4 is coupled to a super charger 62, attached to an exhaust manifold 55, through a flange. The exhaust gas treatment apparatus 4 is a DPF muffler, but it has a larger external size and heavier weight than a conventional muffler. The weight of the exhaust gas treatment apparatus 4 is 20 to 30 Kg which is 4 to 6 times greater than that of the conventional muffler.

As shown in FIG. 15, the exhaust gas treatment apparatus 4 is disposed above the back part of the engine body 1 covering the bonnet 107 so that the length direction of the exhaust gas treatment apparatus 4 is oriented left and right. The exhaust gas treatment apparatus 4 is disposed in the space having the largest gap in the upper and lower directions between the engine body 1 and the ceiling unit 107a of the bonnet 107.

Figure 16:
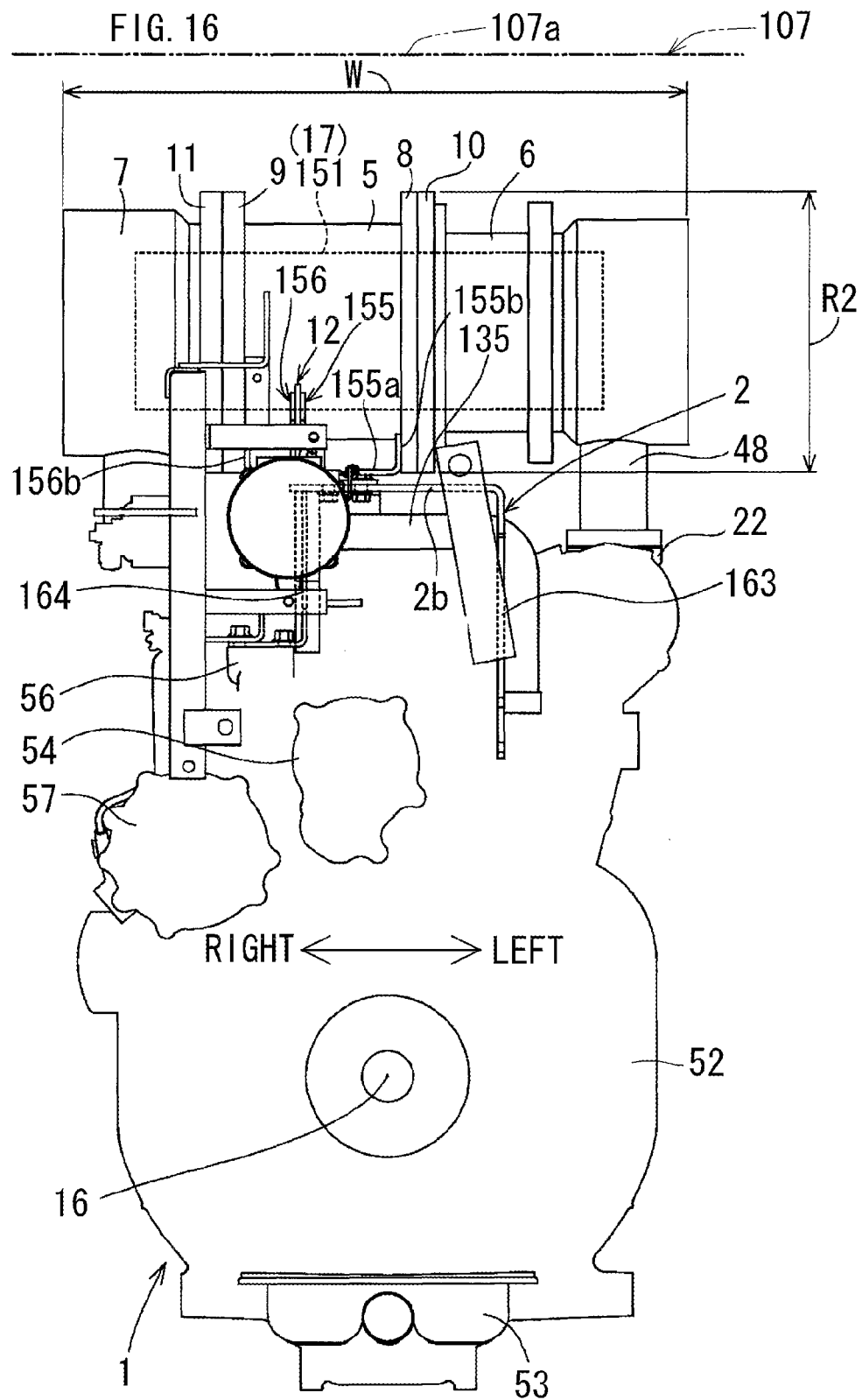
FIG. 16 is a front view the engine of FIG. 14.

As shown in FIG. 16, as in the first embodiment, the casing of the exhaust gas treatment apparatus 4 is divided into three parts; a DPF accommodation casing unit 5, an exhaust inlet-side casing unit 6 on the left side, and an exhaust outlet-side casing unit 7 on the right side. Connection flanges 8 and 9 are formed in the DPF accommodation casing unit 5 placed in a central portion and configured to flange-couple the casing units 6 and 7 on the left and right sides. Connection flanges 10 and 11 corresponding to the connection flanges 8 and 9 are formed at the respective end portions of the casing units 6 and 7 on the left and right sides. The casing units 6 and 7 on the left and right sides are coupled to the DPF accommodation casing unit 5 placed in a central portion by means of the connection flanges 8 and 10 and the connection flanges 9 and 11.

Figure 14:
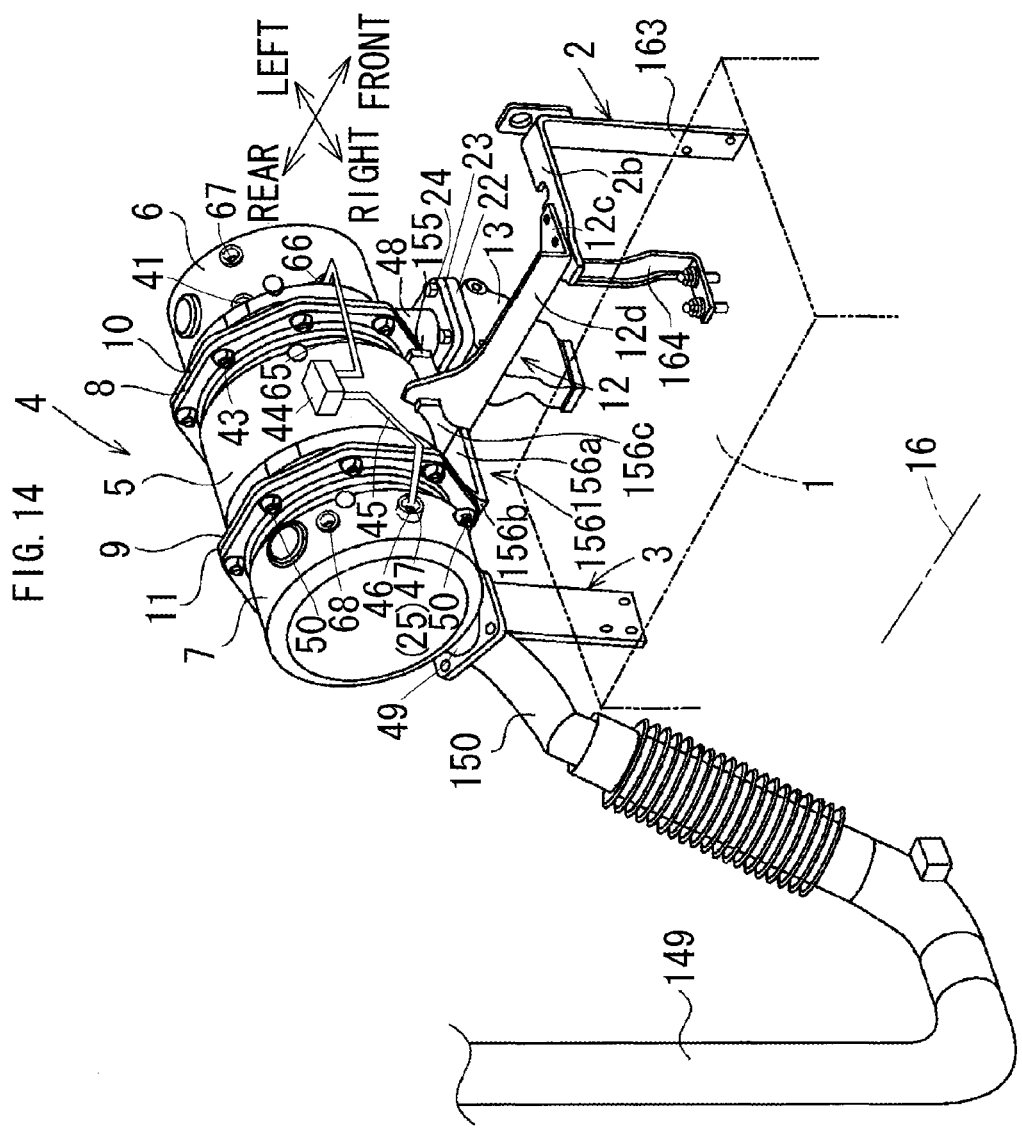
FIG. 14 is a perspective view of an engine having an exhaust gas treatment apparatus attached thereto according to a second embodiment of the present invention, which is seen from the upper side on the front right side.
Figure 17:
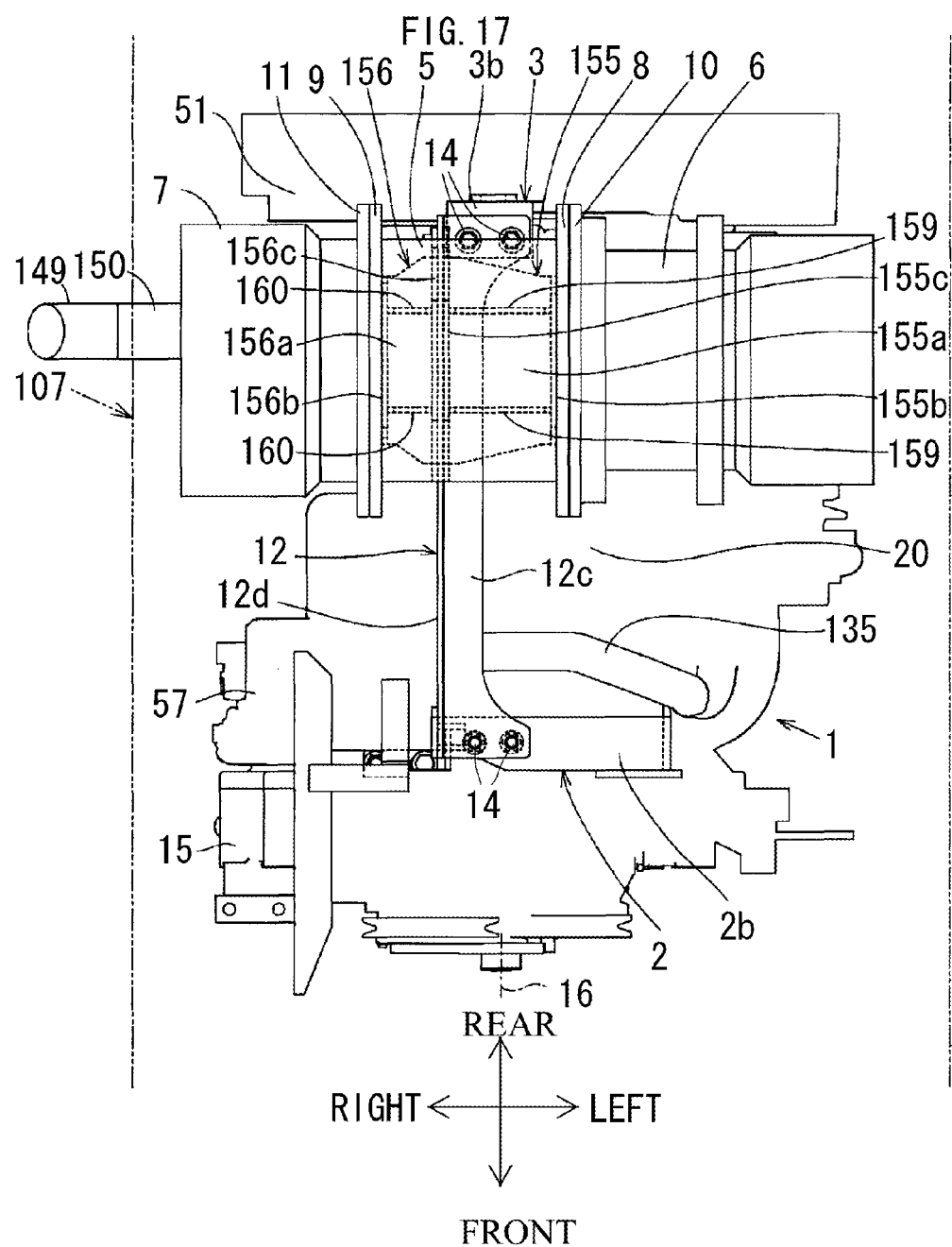
FIG. 17 is a plan view of the engine of FIG. 14.
Figure 19:
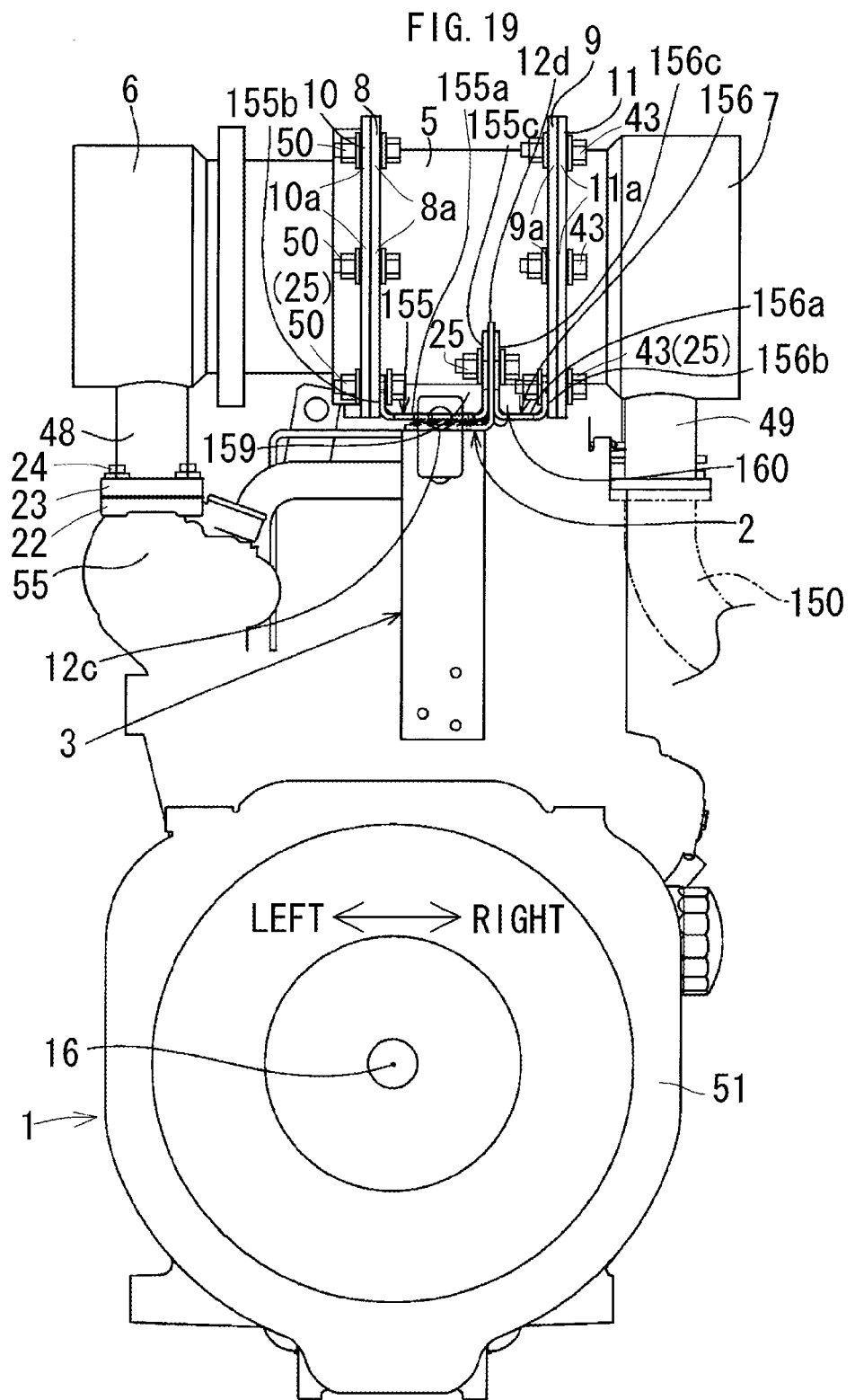
FIG. 19 is a rear view of the engine of FIG. 14.

As shown in FIG. 19, an exhaust inlet pipe 48 is downwardly protruded from the exhaust inlet-side casing unit 6 on the left side and coupled to the exhaust manifold 55 of the engine body 1 through the super charger 62. An exhaust outlet pipe 49 is downwardly led out from the exhaust outlet-side casing unit 7 on the right side and coupled to an exhaust pipe 150. A longitudinal pipe 149 shown in FIGS. 14 and 17 is coupled to the exhaust pipe 150. The longitudinal pipe 149 is disposed on the side of a back part of the engine body 1. As shown in FIG. 16, a muffler element 151, such as a DPF 17, is accommodated in the casing of the exhaust gas treatment apparatus 4.

The sizes of the engine body 1 and the exhaust gas treatment apparatus 4 are compared below. Assuming that, in case of the engine body 1 having 3800 cc, for example, the front and rear width L1 of the engine body 1 is 600 mm, the front and rear width L2 of the engine body 1 including a flywheel housing 51 is 738 mm, and the height H of the engine body 1 is 826 mm as shown in FIG. 15, the diameter R1 of the exhaust gas treatment apparatus 4 is 300 mm as shown in FIG. 15, the diameter R2 of the connection flanges 9 and 11 of the exhaust gas treatment apparatus 4 is 340 mm and the left and right width W of the exhaust gas treatment apparatus 4 is 560 mm as shown in FIG. 16, and the diameter R1 of the exhaust gas treatment apparatus 4 is about ⅓ of the height H of the engine body 1.

As shown in FIG. 14, a single support bracket 12 which is long in the forward and backward directions is disposed at the lower side of the middle part of the exhaust gas treatment apparatus 4 in the left and right directions. The exhaust gas treatment apparatus 4 is placed on the back side of the support bracket 12. The front and back parts of the support bracket 12 are detachably coupled to respective support stays 2 and 3 attached to the front and back sides of the engine body 1. The support stays 2 and 3 are attached to respective connection flanges 8 and 9 on the left and right sides of a DPF accommodation casing 5 placed in a central portion through respective installation members 155 and 156 disposed on the left and right sides and configured to have a 'ᴐ' shape.

As shown in FIG. 19, the installation members 155 and 156 on the left and right sides include respective lower wall portions 155a and 156a of a horizontal shape, respective fixed wall portions 155b and 156b raised from the external ends of the lower wall portions 155a and 156a in the left and right directions, and respective installation wall portions 155c and 156c raised from the internal ends of the lower plate units 155a and 156a in the left and right directions.

As shown in FIG. 19, the fixed wall portions 155b and 156b of the installation members 155 and 156 on the left and right sides are assembled with the respective lower portions of the connection flanges 8 and 9 on the left and side of the DPF accommodation casing unit 5 placed in a central portion and then fastened by bracket installation fastening members 25 and 25. The installation wall portions 155c and 156c of the pair of installation members 155 and 156 have the support unit 12d of the support bracket 12 inserted therebetween on both sides left and right, and they are then fastened by the bracket installation fastening members 25. Accordingly, the support bracket 12 is attached to the connection flanges 8 and 9 on the left and right sides of the DPF accommodation casing unit 5 placed in a central portion through the installation members 155 and 156.

The bracket installation fastening members 25 and 25 which fix the installation members 155 and 156 on the left and right sides to the connection flanges 8 and 9 on the left and right sides also serve as the flange connection fastening members 43 and 50.

As shown in FIGS. 15 and 18, the locked units 10a and 11a, such as the connection flanges 10 and 11 locked by the flange connection fastening members 43 and 50, are spaced apart from each other at equal angles of 60° and placed at 6 places in the circumferential direction of the connection flanges 10 and 11.

As shown in FIG. 19, the lower plate units 155a and 156a, the fixed wall portions 155b and 156b, and the installation wall portions 155c and 156c of the installation members 155 and 156 on the left and right sides are coupled by connection plates 159 and 160.

As shown in FIG. 14, the front support stay 2 installed in the front part of the engine body 1 has a placement unit 2b of a horizontal form. The placement unit 2b couples the upper end portions of a pair of support legs 163 and 164 and a pair of support legs 163 and 164 on the left and right sides.

The lower portion of the support leg 163 on the left side is fixed to the left face of a cylinder head 19 of the front part of the engine body 1, and the lower portion of the support leg 164 on the right side is fixed to the upper right portion of the front part of the engine body 1.

As shown in FIG. 15, in a support stay 3 on the back side, the lower portion of a stay installation unit 3a having an upper and lower long belt form is fixed to the back side of the engine body 1. A placement unit 3b forwardly curved in an 'L' form is formed at the top of the stay installation unit 3a.

According to the second embodiment, in case where the exhaust gas treatment apparatus 4 is installed within the bonnet 107 as shown in FIG. 15, the support bracket 12 long in the forward and backward directions is previously attached to the lower side of a middle portion of the exhaust gas treatment apparatus 4 in the left and right directions, the support stays 2 and 3 on the front and back sides are previously installed in the front and rear portions of the engine body 1, the front part of the support bracket 12 is placed in the placement unit 2b of the front stay 2, the back part of the support bracket 12 is placed on the placement unit 3b of the rear support stay 3, and the front and back parts of the support bracket 12 are fixed to the placement units 2b and 3b using bracket installation fastening members 14, such as bolts. Accordingly, although the exhaust gas treatment apparatus 4 has a large size and heavy weight, the exhaust gas treatment apparatus 4 can be simply installed in the engine body 1.

Furthermore, after the exhaust gas treatment apparatus 4 is installed, the front and back parts of the support bracket 12 supporting the weight of the exhaust gas treatment apparatus 4 are detachably coupled to the support stays 2 and 3 on the front and back sides which are installed in the front and back parts of the engine body 1. Accordingly, although the exhaust gas treatment apparatus 4 has a large size and heavy weight, it can sufficiently stand self weight and a vibration of the tractor vehicle 102, and the deformation and damage of the support bracket 12 can be prevented. Furthermore, the length direction of the exhaust gas treatment apparatus 4 is disposed in the left and right directions. Accordingly, more empty space can be secured as compared with a case in which the length direction of the exhaust gas treatment apparatus 4 is disposed in the forward and backward directions. Furthermore, since the longitudinal pipe 149 is disposed on the side of the back part of the engine body 1, the front and rear distance from the front part of the exhaust gas treatment apparatus 4 to the longitudinal pipe 149 can be reduced, and thus space above the engine body 1 can be efficiently used.

Furthermore, as shown in FIG. 19, the connection flanges 8 and 9 are configured to flange-couple the casing units 6 and 7 on the left and right sides and formed in the DPF accommodation casing unit 5 placed in a central portion, and the support bracket 12 is installed on both sides of the connection flanges 8 and 9 on the left and right sides of the DPF casing unit 5 placed in a central portion through the installation members 155 and 156. Accordingly, the support bracket 12 and the connection flanges 8 and 9 on the left and right sides can be easily coupled. Furthermore, the support bracket 12 can be robustly fixed and installed in the middle portion of the exhaust gas treatment apparatus 4 using the connection flanges 8 and 9 of the casing unit 5. Accordingly, the deformation and damage of the support bracket 12 can be prevented.

Furthermore, as shown in FIG. 15, the bonnet 107 is formed with the ceiling unit 107a downwardly inclined, and the exhaust gas treatment apparatus 4 is disposed left and right at a position having the greatest gap between the engine body 1 and the back part of the bonnet 107. Accordingly, the exhaust gas treatment apparatus 4 of a large size can be disposed in small space, and the weight of the tractor 102 itself can be well balanced on the front and back sides.

Other constructions or functions of the second embodiment are the same as those of the first embodiment, and the same elements as those of the first embodiment in FIGS. 14 to 20 are assigned the same reference numerals as FIGS. 1 to 13.

FIGS. 21 to 27 show a third embodiment. A pair of support brackets 12a and 12b on the left and right sides are disposed in response to respective connection flanges 8 and 9 on the left and right sides of a DPF casing unit 5 placed in a central portion. The front parts of the pair of support brackets 12a and 12b are detachably coupled to the upper portion of a front support stay 2. The back parts of the pair of support brackets 12a and 12b are detachably coupled to the upper portion of the rear support stay 3.

Figure 26:
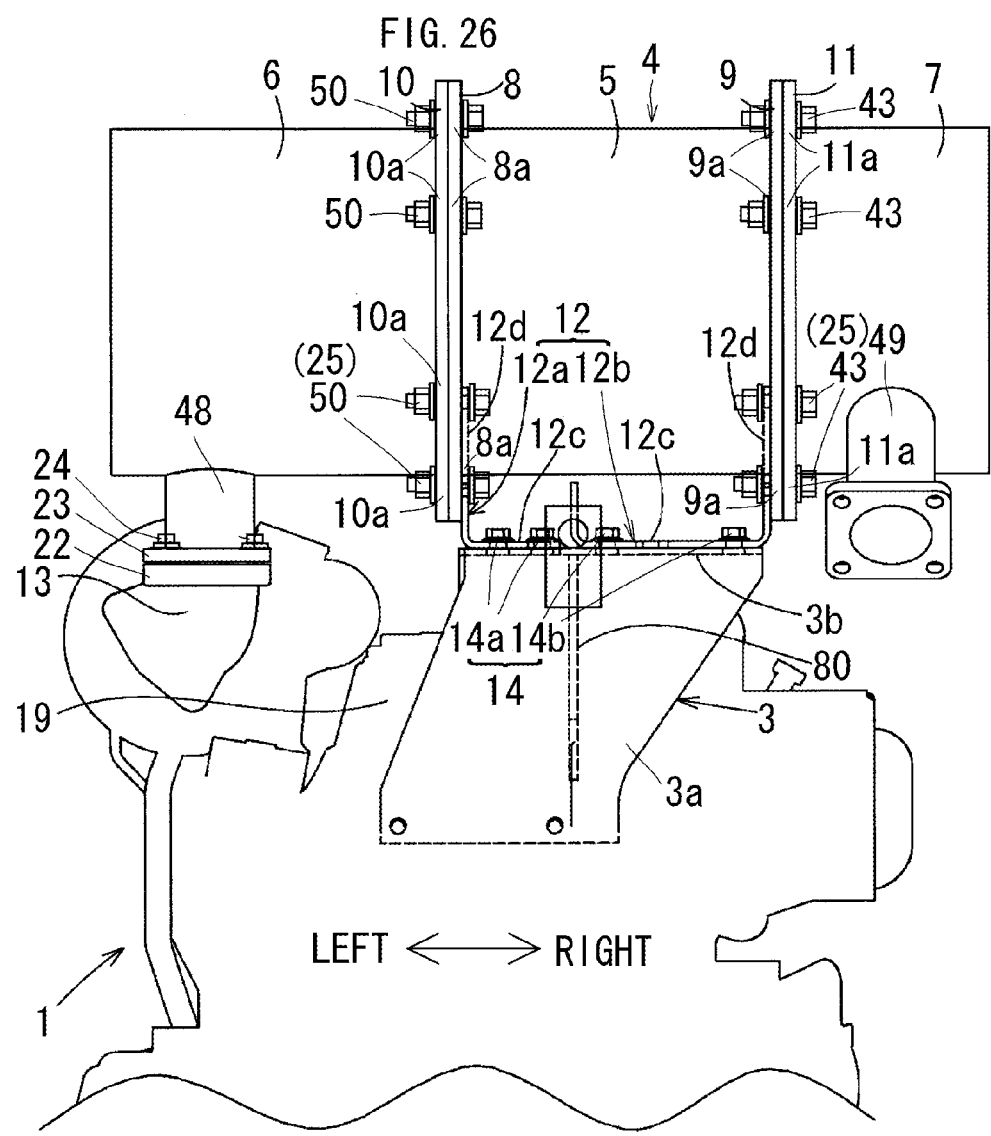
FIG. 26 is a rear view of the engine of FIG. 21.

As shown in FIG. 26, the support unit 12d of the support bracket 12a on the left side is assembled with the lower portion of the connection flange 8 on the left side of the DPF casing unit 5 placed in a central portion and fastened by bracket installation fastening members 25 and 25. The support unit 12d of the support bracket 12b on the right side is assembled with the lower portion of the connection flange 9 on the right side of the DPF casing unit 5 placed in a central portion and fastened by bracket installation fastening members 25 and 25.

The bracket installation fastening members 25 and 25 also serve as flange connection fastening members 43 and 50 and attach the support brackets 12a and 12b on the left and right sides to the connection flanges 8 and 9 on the left and right sides.

Figure 22:
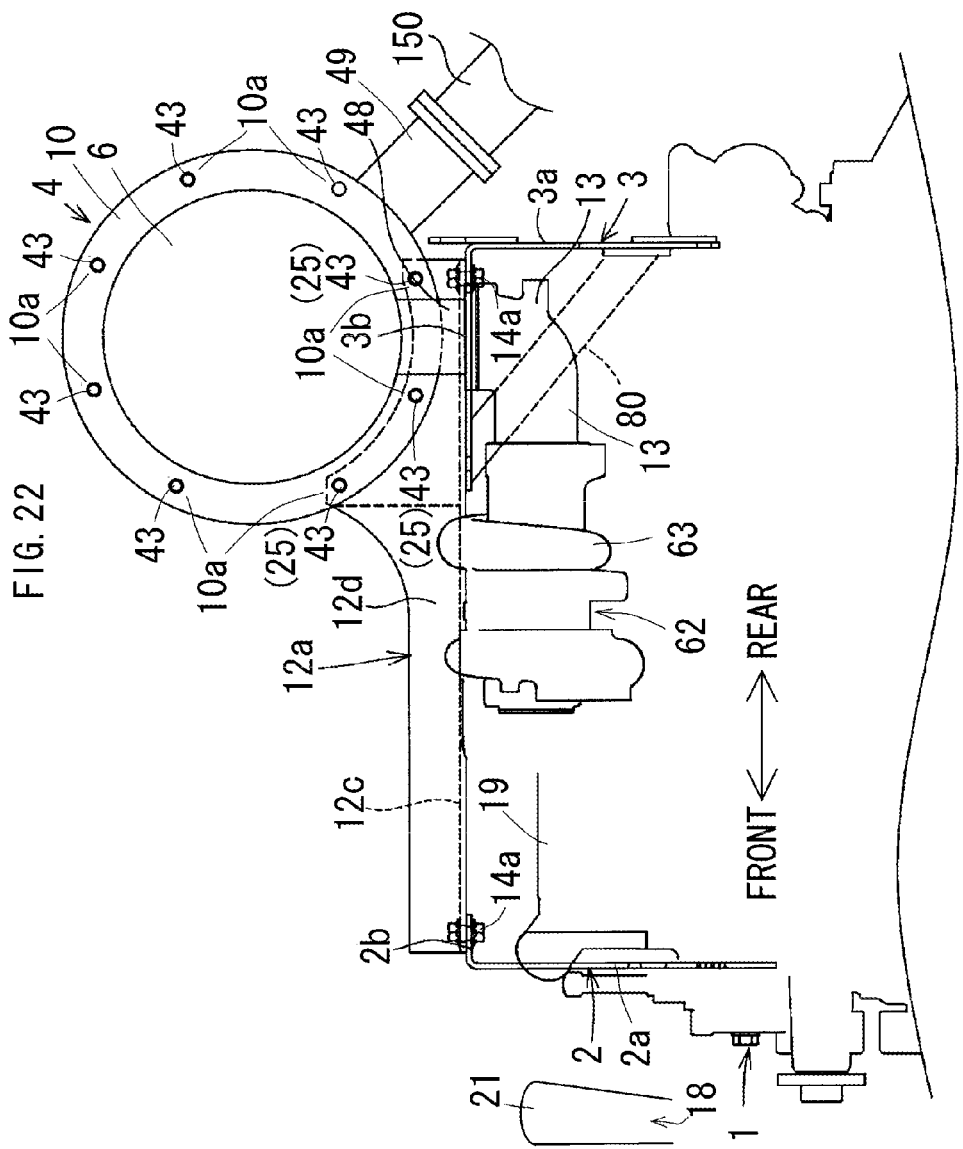
FIG. 22 is a lateral view of the engine of FIG. 21, seen from the left side.
Figure 23:
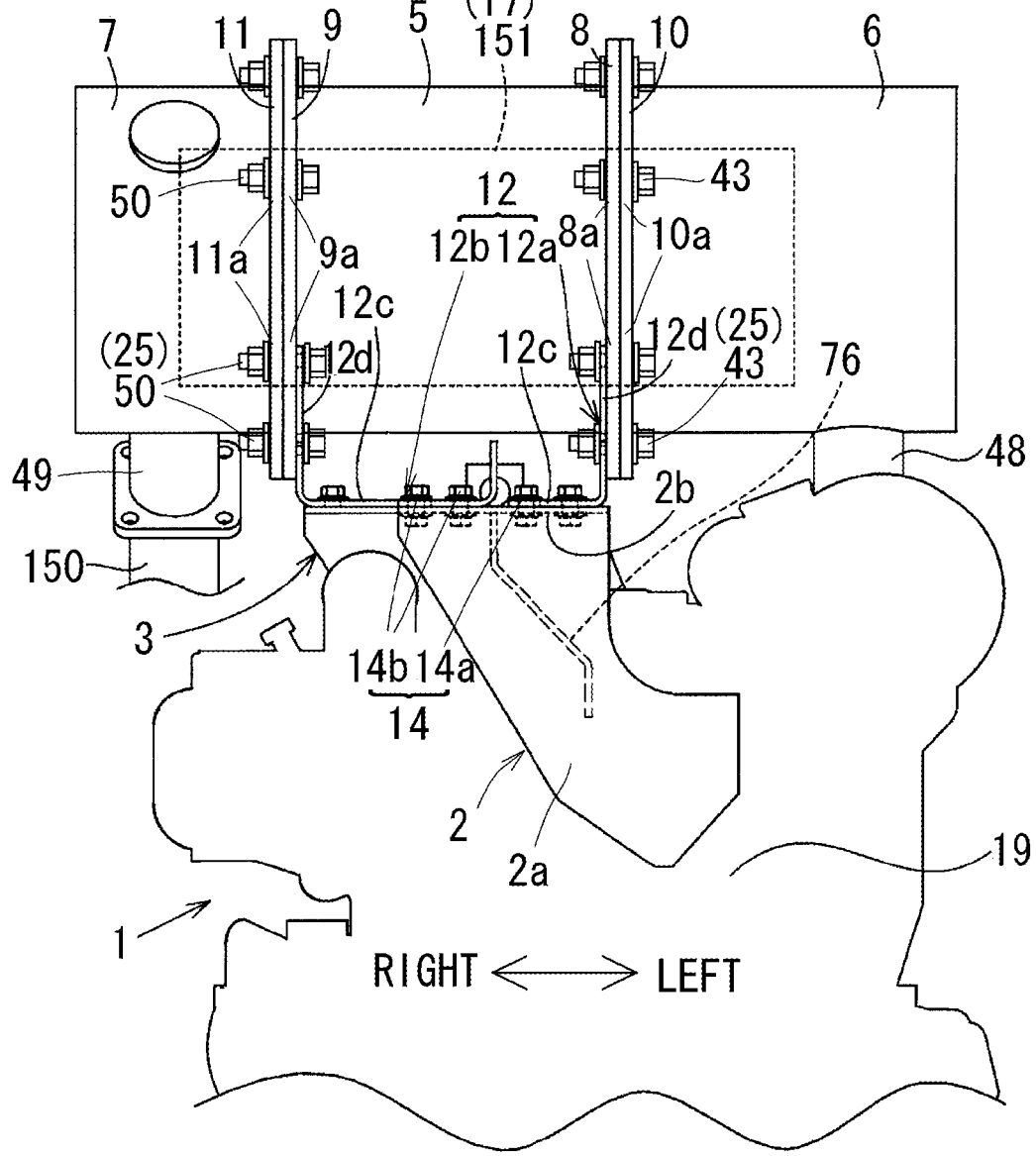
FIG. 23 is a front view of the engine of FIG. 21.
Figure 24:
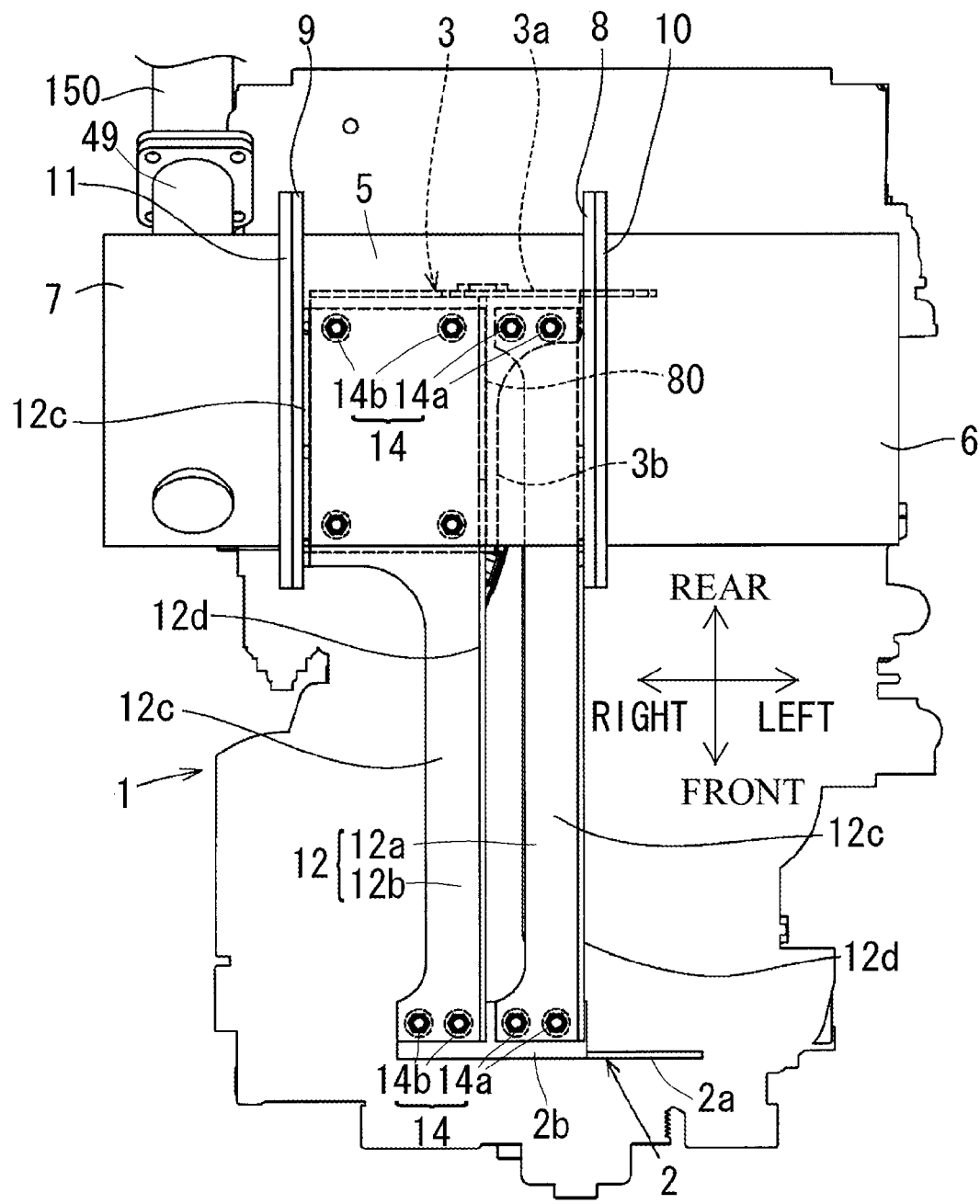
FIG. 24 is a plan view of the engine of FIG. 21.
Figure 25:
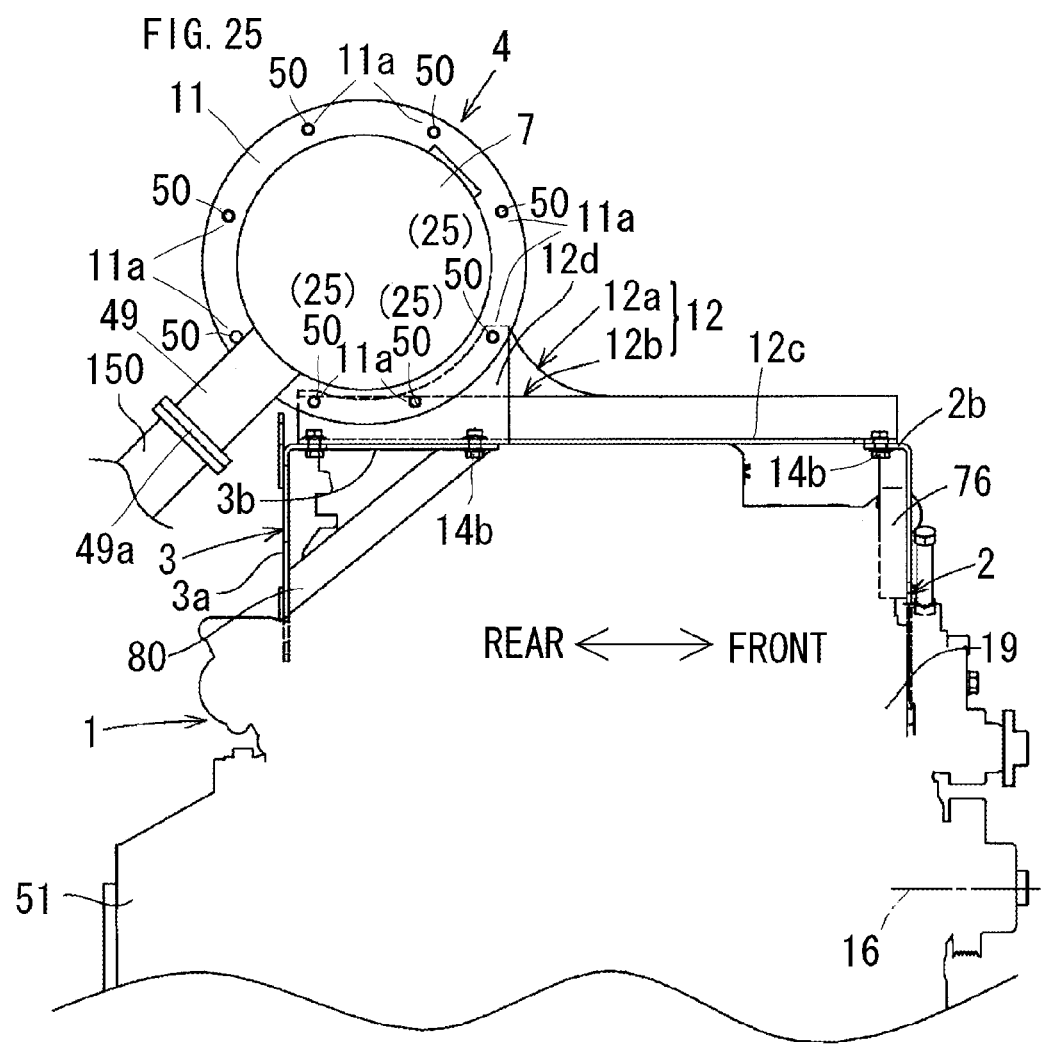
FIG. 25 is a lateral view of the engine of FIG. 21, seen from the right side.

As shown in FIGS. 22 and 25, locked units 10a and 11a, such as connection flanges 10 and 11 fastened by respective flange connection fastening members 43 and 50, are spaced apart from each other at equal angles of 45° and placed at 8 places in the circumferential direction of the connection flanges 10 and 11.

The back side of the front support stay 2 is reinforced by a reinforcement plate 76.

The rear support stay 3 has an installation unit 3a and a placement unit 3b coupled by a reinforcement plate 80.

According to the third embodiment, as in the second embodiment, although the exhaust gas treatment apparatus 4 has a large size and heavy weight, the exhaust gas treatment apparatus 4 can stand its weight and a vibration of the tractor vehicle 102. Furthermore, the pair of support brackets 12a and 12b installed in the exhaust gas treatment apparatus 4 can detachably coupled to the support stays 2 and 3 on the front and back sides of the front and back parts of the engine body 1. Accordingly, the exhaust gas treatment apparatus 4 can be easily installed in the engine body 1.

Moreover, in the third embodiment, the pair of support brackets 12a and 12b on the left and right sides are disposed in response to the respective connection flanges 8 and 9 on the left and right sides of the DPF casing unit 5 placed in a central portion. The front parts of the pair of support brackets 12a and 12b on the left and right sides are detachably coupled to the upper portion of the front support stay 2. The back parts of the pair of support brackets 12a and 12b on the left and right sides are detachably coupled to the upper portion of the rear support stay 3, and the pair of support brackets 12a and 12b on the left and right sides are used. Accordingly, the exhaust gas treatment apparatus 4 can be easily and robustly installed through the pair of support brackets 12a and 12b on the left and right sides by using the connection flanges 8 and 9 on the left and right sides of the DPF casing unit 5 placed in a central portion.

Figure 27:
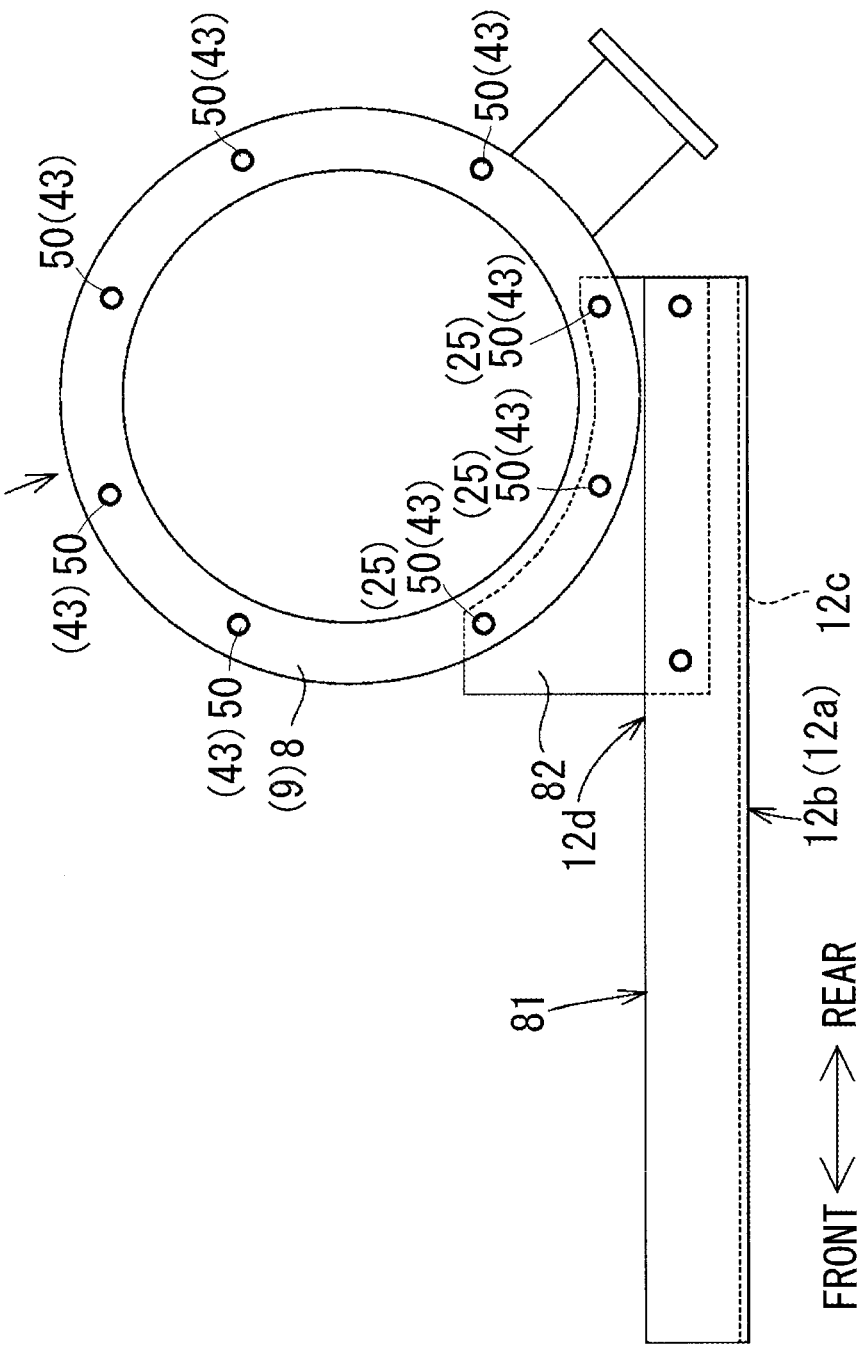
FIG. 27 is a lateral view showing a modification example of a support bracket used in the engine of FIG. 21.

FIG. 27 shows a modification example of the support bracket. The support unit 12d of support brackets 12a and 12b is divided into a support member body 81 and a fixing plate body 82 which is fixed to connection flanges 8 and 9 on the left and right sides of a DPF casing unit 5 placed in a central portion. The support member body 81 and the fixing plate body 82 are detachably fastened by a fixture, such as bolts. In the modification example, although the support member body 81 and the fixing plate body 82 are detached, the exhaust gas treatment apparatus 4 can be detached from the engine body 1. Accordingly, periodic inspection can be easily performed on the exhaust gas treatment apparatus 4.

Other constructions or functions of the third embodiment are the same as those of the first and second embodiments, and the same elements as those of the first and second embodiments in FIGS. 21 to 27 are assigned the same reference numerals as those of FIGS. 1 to 20.

In the second embodiment of FIGS. 14 to 20, a single support bracket 12 is installed in the connection flanges 8 and 9 on the left and right sides of the DPF casing unit 5, placed in a central portion, of the exhaust gas treatment apparatus 4 through the pair of installation members 155 and 156. Furthermore, in the third embodiment of FIGS. 21 to 26, the support brackets 12a and 12b on the left and right sides are installed in the respective connection flanges 8 and 9 on the left and right sides of the casing unit 5 placed in a central portion of the exhaust gas treatment apparatus 4. However, the support brackets 12, 12a, and 12b may be installed only in one of the connection flanges 8 and 9 on the left and right sides of the casing unit 5 placed in a central portion of the exhaust gas treatment apparatus 4.

The construction of a fourth embodiment shown in FIGS. 28 to 30 is described below.

As shown in FIGS. 28 and 29, an exhaust gas treatment apparatus 4 is placed at a long posture in the left and right directions, and the DPF accommodation casing unit 5 of the exhaust gas treatment apparatus 4 is disposed on the upper back side of a flywheel housing 51 immediately after a head cover 20 attached to the upper portion of a cylinder head 19.

A pair of support stays 71 and 72 on the left and right sides are installed in the rear portion of the engine body 1. The support protrusions 32 and 33 of the connection flange 10 of an exhaust inlet-side casing unit 6 and of the connection flange 11 of an exhaust outlet-side casing unit 7 are installed in the pair of left and right support stays 71 and 72 using flange installation locking units 73 without using support brackets on the left and right sides. The flange installation locking units 73 are inserted into position adjustment holes, like the position adjustment holes 26 of the bracket installation fastening members 25, and configured to pass therethrough. Furthermore, the positions of the flange installation locking units 73 can be adjusted in the upper and lower directions and the forward and backward directions. In addition, like the flange-fit concave units 38a and 38b, flange fitting units 74 are installed in a pair of stays on the left and right sides. Lower edge portions, such as the connection flange 11, are fitted into the fitting units 74.

In the fourth embodiment, like the first embodiment, the DPF 17 is accommodated in the exhaust gas treatment apparatus 4, and the engine cooling fan 21 is disposed in the front part of the engine body 1.

Other constructions or functions of the fourth embodiment are the same as those of the first embodiment, and the same elements as those of the first embodiment in FIGS. 28 to 30 are assigned the same reference numerals as those of FIGS. 1 to 13.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An engine having an exhaust gas treatment apparatus attached thereto, wherein the exhaust gas treatment apparatus (4) is supported by an engine body and the engine body (1) and the exhaust gas treatment apparatus (4) communicate with each other through an exhaust pipe (13), the engine comprising:
   a casing of the exhaust gas treatment apparatus (4) comprising a plurality of casing units (5, 6), and (7) separable from each other;
   connection flanges (8, 9, 10), and (11) disposed in respective end portions of the casing units (5, 6), and (7),
   wherein the casing units (5, 6), and (7) are coupled together by a connection of the connection flanges (8, 9, 10), and (11),
   the exhaust gas treatment apparatus (4) is supported by the engine body (1) through the connection flanges (8, 9, 10), and (11), and support brackets (12a) and (12b),
   the connection flange (9) of the intermediate casing unit (5) and the connection flange (11) of the exhaust outlet-side casing unit (7) overlap with each other and an outer peripheral edge of the connection flange (9) and an outer peripheral edge of the connection flange (11) are respectively formed in a shape of a polygon,
   the plurality of casing units include an exhaust inlet-side casing unit (6) and an exhaust outlet-side casing unit (7) detachably coupled to both ends of an intermediate casing unit (5),
   a flange-fit concave unit (38b) having an upper portion opened is installed in the support bracket (12b), and
   a top peripheral edge of the flange-fit concave unit (38b) has a cornered shape that extends along a corner portion of a lower edge of the overlapped connection flanges (9) and (11), and the lower edge of at least one of the overlapped connection flanges (9, 11) corresponds to the top peripheral edge and rests within the top peripheral edge of the flange-fit concave unit (38b).

2. The engine as set forth in claim 1, wherein the exhaust gas treatment apparatus (4) is supported by the engine body (1) through the plurality of connection flanges (8, 9, 10), and (11) spaced apart from each other.

3. The engine as set forth in claim 1, wherein:
   support stays (2) and (3) are installed in the engine body (1),
   a support bracket (12) is attached to the connection flanges (8, 9, 10) and (11) and placed on the support stays (2) and (3),
   a weight of the exhaust gas treatment apparatus (4) is supported by the support stays (2) and (3) through the support bracket (12), and
   the support bracket (12) is installed in the support stays (2) and (3) using bracket installation fastening members (14).

4. The engine as set forth in claim 3, wherein in a state in which a direction along which a crank shaft center line (16) extends is forward and backward directions and a width direction of the engine body (1) orthogonal to the crank shaft center line (16) is left and right directions,
the support stays (2) and (3) include the support stays (2) and (3) on front and back sides, the support stays (2) and (3) on the front and back sides are respectively installed on front and back sides of the engine body (1), the support bracket (12) is lengthily formed forward and backward, the support bracket (12) is installed between the support stays (2) and (3) on the front and back sides, and the exhaust gas treatment apparatus (4) is supported by the engine body (1) through the support stays (2) and (3) on the front and back sides in a state in which the exhaust gas treatment apparatus (4) has a long posture in the left and right directions.

5. The engine as set forth in claim 4, wherein:
the support bracket (12) comprises the support brackets (12a) and (12b) on the left and right sides,
the support brackets (12a) and (12b) on the left and right sides are respectively attached to the connection flanges (8, 9, 10), and (11) on the left and right sides, and
front and rear end portions of the support brackets (12a) and (12b)on the left and right sides are placed above the support stays (2) and (3) on the front and back sides and installed using bracket installation fastening members (14a) and (14b) on the left and right sides.

6. The engine as set forth in claim 3, wherein an exhaust inlet flange (23) of the exhaust gas treatment apparatus (4) is placed above an engine exhaust outlet flange (22) of the engine body (1).

7. The engine as set forth in claim 3, wherein:
support brackets (12a) and (12b) are attached to the connection flanges (10) and (11) using bracket installation fastening members 25,
position adjustment holes (26) of the bracket installation fastening members (25) are formed in at least one of the connection flanges (10) and (11) and the support brackets (12a) and (12b), and
positions of at least upper and lower directions of the bracket installation fastening members (25) can be adjusted using the position adjustment holes (26).

8. The engine as set forth in claim 7, wherein:
the position adjustment holes (26) of the bracket installation fastening members (25) comprise large-diameter holes (27),
the large-diameter holes (27) are formed in one of the connection flanges (10) and (11) and the support bracket (12) and small-diameter holes (28) are formed in the other of the connection flanges (10) and (11) and the support bracket (12),
an inside diameter of each of the large-diameter holes (27) is set to a size in which a portion through which the bracket installation fastening member (25) inserted into the large-diameter hole (27) passes can be moved and adjusted in a direction orthogonal to a direction along which the portion passes,
an inside diameter of each of the small-diameter holes (28) is set to a size in which a portion through which the bracket installation fastening member (25) inserted into the small-diameter hole (28) passes cannot be moved and adjusted in a direction orthogonal to a direction along which the portion passes, and
in a state in which a direction along which a crank shaft center line (16) extends is forward and backward directions and a width direction of the engine body (1) orthogonal to the crank shaft center line (16) is left and right directions, the large-diameter hole (27) and the small-diameter hole (28) overlap with each other left and right and the bracket installation fastening members (25) are inserted into the overlapping position and configured to pass therethrough.

9. The engine as set forth in claim 3, wherein in a state in which a direction along which a crank shaft center line (16) extends is forward and backward directions and a width direction of the engine body (1) orthogonal to the crank shaft center line (16) is left and right directions,
support brackets (12a) and (12b) are installed in the support stays (2) and (3) using respective bracket installation fastening members (14a) and (14b), position adjustment holes (29) of bracket installation fastening members (14a) and (14b) are installed in at least one of the support brackets (12a) and (12b) and the support stays (2) and (3), and positions of at least forward and backward directions and left and right directions of the bracket installation fastening members (14a) and (14b) can be adjusted using the position adjustment holes (29).

10. The engine as set forth in claim 9, wherein:
the position adjustment holes (29) of the bracket installation fastening members (14a) and (14b) comprise a long hole (30) in the forward and backward directions and a long hole (31) in the left and right directions,
the long hole (30) of the forward and backward directions is formed in one of the support stays (2) and (3) and the support brackets (12a) and (12b),
the long hole (31) of the left and right directions is formed in the other of the support stays (2) and (3) and the support brackets (12a) and (12b),
the long hole (30) of the forward and backward directions and the long hole (31) of the left and right directions overlap with each other up and down in a crossing form, and
the bracket installation fastening members (14a) and (14b) are inserted into the overlapping position and configured to pass therethrough.

11. The engine as set forth in claim 1, wherein in accommodating a DPF (17) in the exhaust gas treatment apparatus (4), in a state in which a direction along which a crank shaft center line (16) extends is forward and backward directions,
an engine cooling fan (18) is disposed in a front part of the engine body (1), and the exhaust gas treatment apparatus (4) is disposed at a position higher than an upper end portion (21) of the engine cooling fan (18) on an upper side of a head cover (20) attached to an upper portion of a cylinder head (19).

12. The engine as set forth in claim 1, wherein:
the intermediate casing unit (5) accommodates a DPF (17).

13. The engine as set forth in claim 12, wherein:
the connection flanges (8) and (9) of the DPF accommodation casing unit (5) overlap with the connection flanges (10) and (11) of the exhaust inlet-side casing unit (6) and the exhaust outlet-side casing unit (7),
support protrusions (32) and (33) are formed in the connection flanges (10) and (11) of the exhaust inlet-side casing unit (6) and the exhaust outlet-side casing unit (7) and externally more protruded than the connection flanges (8) and (9) of the DPF accommodation casing unit (5) in a diameter direction,
the exhaust gas treatment apparatus (4) is supported by the engine body (1) through the support protrusions (32) and (33), and
in a state in which the exhaust inlet-side casing unit (6) and the exhaust outlet-side casing unit (7) are supported by the engine body (1), the DPF accommodation casing unit (5) is capable of being pulled out between the exhaust inlet-side casing unit (6) and the exhaust outlet-side casing unit (7).

14. The engine as set forth in claim 12, wherein:
a pipe installation boss (46) having an exhaust pressure entrance pipe (45) of an exhaust pressure sensor (44) installed therein is disposed in a peripheral wall of the exhaust outlet-side casing unit (7), and
a boss hole (47) of the pipe installation boss (46) is upwardly formed externally.

15. The engine as set forth in claim 12, wherein:
an exhaust inlet pipe (48) is installed in the exhaust inlet-side casing unit (6),
a plurality of locked units (8a) and (10a) is spaced apart from each other at equal angles and arranged in the connection flanges (8) and (10) where the DPF accommodation casing unit (5) and the exhaust inlet-side casing unit (6) overlap with each other in a circumferential direction, and
the exhaust inlet-side casing unit (6) is moved in the circumferential direction in a unit of the spaced angle, and a locked unit (10a) of the connection flange (10) of the exhaust inlet-side casing unit (6) is matched with a locked unit (8a) of the connection flange (8) of the DPF accommodation casing unit (5) and then fastened using a flange connection fastening member (43), so that a posture of the exhaust inlet-side casing unit (6) can be changed in the circumferential direction and thus a direction of an inlet (48a) of the exhaust inlet pipe (48) can be changed.

16. The engine as set forth in claim 12, wherein:
an exhaust outlet pipe (49) is installed in the exhaust outlet-side casing unit (7),
a plurality of locked units (11a) and (9a) is spaced apart from each other at equal angles and arranged in a circumferential direction in the connection flanges (11) and (9) where the exhaust outlet-side casing unit (7) and the DPF accommodation casing unit (5) overlap with each other,
the exhaust outlet-side casing unit (7) is moved in a unit of the spaced angle in the circumferential direction, and the locked unit (11a) of the connection flange (11) of the exhaust outlet-side casing unit (7) is matched with the locked unit (9a) of the connection flange (9) of the DPF accommodation casing unit (5) and then fastened using flange connection fastening members (50), so that a posture of the exhaust outlet-side casing unit (7) can be changed in the circumferential direction and thus a direction of an outlet (49a) of the exhaust outlet pipe (49) can be changed.

17. An engine having an exhaust gas treatment apparatus attached thereto, wherein the exhaust gas treatment apparatus (4) is supported by an engine body and the engine body (1) and the exhaust gas treatment apparatus (4) communicate with each other through an exhaust pipe (13), the engine comprising:
a casing of the exhaust gas treatment apparatus (4) comprising a plurality of casing units (5, 6), and (7) separable from each other; and
connection flanges (8, 9, 10), and (11) disposed in respective end portions of the casing units (5, 6), and (7),
wherein the casing units (5, 6), and (7) are coupled together by a connection of the connection flanges (8, 9, 10), and (11), and
the exhaust gas treatment apparatus (4) is supported by the engine body (1) through the connection flanges (8, 9, 10), and (11), and support brackets (12a) and (12b),
the casing units include an exhaust inlet-side casing unit (6) and an exhaust outlet-side casing unit (7) detachably coupled to both ends of an intermediate casing unit (5),
a ring-shaped spacer (39) is interposed between the respective connection flanges (8) and (10) of the intermediate casing unit (5) and the exhaust inlet-side casing unit (6),
an outer peripheral edge of the connection flange (10) of the exhaust inlet-side casing unit (6) is formed in a shape of a polygon,
a flange-fit concave unit (38a) having an upper portion opened is installed in the support bracket (12a),
a top peripheral edge of the flange-fit concave unit (38a) has a cornered shape that extends along a corner portion of a lower edge of the connection flange (10) of the exhaust inlet-side casing unit (6), and the lower edge of the connection flange (10) corresponds to the top peripheral edge and rests within the top peripheral edge of the flange-fit concave unit (38a).

18. An engine having an exhaust gas treatment apparatus attached thereto, wherein the exhaust gas treatment apparatus (4) is supported by an engine body and the engine body (1) and the exhaust gas treatment apparatus (4) communicate with each other through an exhaust pipe (13), the engine comprising:
a casing of the exhaust gas treatment apparatus (4) comprising a plurality of casing units (5, 6), and (7) separable from each other; and
connection flanges (8, 9, 10), and (11) disposed in respective end portions of the casing units (5, 6), and (7),
wherein the casing units (5, 6), and (7) are coupled together by a connection of the connection flanges (8, 9, 10), and (11), and
the exhaust gas treatment apparatus (4) is supported by the engine body (1) through the connection flanges (8, 9, 10), and (11), and support brackets (12a) and (12b),
the plurality of casing units include an exhaust inlet-side casing unit (6) and an exhaust outlet-side casing unit (7) detachably coupled to both ends of an intermediate casing unit (5),
a ring-shaped spacer (39) is interposed between the respective connection flanges (8) and (10) of the intermediate casing unit (5) and the exhaust inlet-side casing unit (6),
an outer peripheral edge of the ring-shaped spacer (39) is formed in a shape of a polygon,
a spacer-fit concave unit (38a) having an upper portion opened is installed in the support bracket (12a),
a top peripheral edge of the spacer-fit concave unit (38a) has a cornered shape that extends along a corner portion of a lower edge of the ring-shaped spacer (39), and lower edge of the ring-shaped spacer (39) corresponds to the top peripheral edge and rests within the top peripheral edge of the spacer-fit concave unit (38a).

* * * * *